US012572733B1

(12) United States Patent
Hartog et al.

(10) Patent No.: US 12,572,733 B1
(45) Date of Patent: Mar. 10, 2026

(54) DOCUMENT GENERATION PLATFORM FOR GENERATIVE AI ASSISTED DOCUMENT GENERATION

(71) Applicant: Templafy ApS, Copenhagen (DK)

(72) Inventors: Arjen Hartog, Eindhoven (NL); Christian Lund, Valby (DK); Oskar Konstantyner, Alsgarde (DK); Bo Larsen, Copenhagen (DK); Ehsan Kalafchi, Houten (NL); Mladen Drmac, Eindhoven (NL); Anton Jespersen, Copenhagen (DK); Louise Jensen, Copenhagen (DK); Alexander Van Eerd, Eindhoven (NL)

(73) Assignee: Templafy ApS, Copenhagen (DK)

( * ) Notice: Subject to any disclaimer, the term of this patent is extended or adjusted under 35 U.S.C. 154(b) by 0 days.

(21) Appl. No.: 19/197,004

(22) Filed: May 2, 2025

(51) Int. Cl.
| | |
|---|---|
| *G06F 40/186* | (2020.01) |
| *G06F 40/109* | (2020.01) |
| *H04L 9/40* | (2022.01) |

(52) U.S. Cl.
CPC .......... *G06F 40/186* (2020.01); *G06F 40/109* (2020.01); *H04L 63/08* (2013.01)

(58) Field of Classification Search
CPC ....... G06F 40/109; G06F 40/186; H04L 63/08
See application file for complete search history.

(56) References Cited

U.S. PATENT DOCUMENTS

| | | | |
|---|---|---|---|
| 2024/0193234 A1* | 6/2024 | Hwang ................. | G06F 21/316 |
| 2024/0256337 A1* | 8/2024 | Verma ................. | G06F 9/5011 |
| 2024/0320952 A1* | 9/2024 | Petitpont ............... | G06V 10/82 |
| 2024/0331822 A1* | 10/2024 | Chandrasekar ........ | G16H 40/67 |
| 2025/0156198 A1* | 5/2025 | Kaliyaperumal ....... | G06F 9/451 |
| 2025/0200128 A1* | 6/2025 | Parasnis ............. | G06F 16/9577 |

OTHER PUBLICATIONS

Horvath et al. "Structured Template Language and Generative AI Driven Content Management for Personalized Workspace Reconfiguration," Oct. 26-27, 2023, 2023 IEEE 2nd International Conference on Cognitive Aspects of Virtual Reality (CVR), pp. 17-22. (Year: 2023).*
Krouskas et al. "ChatGPT—based Recommendations for Personalized Content Creation and Instructional Design with a Tailored Prompt Generator," Nov. 26-29, 2024, 2024 2nd International Conference on Foundation and Large Language Models (FLLM), pp. 295-299. (Year: 2024).*

* cited by examiner

*Primary Examiner* — Kyle R Stork
(74) *Attorney, Agent, or Firm* — Flaster Greenberg P.C.

(57) ABSTRACT

A document generation platform may include one or more computing devices and/or software hosted on the computing devices. The document generation platform may receive a request for content generation from a user. The document generation platform may perform data collection (e.g., by interfacing with an enterprise system via an application-programming interface (API). The document generation platform may generate a content shell based on the request. The document generation platform may interface with a generative artificial intelligence (AI) server and receive generative AI output. The document generation platform may insert inputs into the content shell, including inputs from the user, the enterprise system, and/or the generative AI server, and perform formatting of each input. The document generation server may finalize the content shell, convert it into a document, and send it to a user.

20 Claims, 9 Drawing Sheets

100. Document Generation Platform

102a. API subsystem

102b. Automation subystem

102. Subsystems

104. Data storage

106. User Application

108. Enterprise System

110. Generative AI Server

400

902 Executive Summary

904 Problem Analysis

906 Market Insights

908 Objectives and Proposed Solution

910 Timeline

912 Customer References

914 Team Bios

916 Scope of the project

918 Pricing

920 Next Steps

Use Generative AI

Use Generative AI

900

DOCUMENT GENERATION PLATFORM FOR GENERATIVE AI ASSISTED DOCUMENT GENERATION

BACKGROUND

Document generation platforms may enable users to automate the creation of documents. For example, document generation platforms may be implemented to automatically generate documents. A document generation platform can be implemented to create documents at the request of a user that may be updated for their specific use. However, current document generation platforms often lack specific information about an organization and/or the proper content for the purpose of the document.

SUMMARY OF THE INVENTION

A document generation platform may be used to generate documents electronically. The document generation platform may be hosted on a content generation server. The document generation platform may be configured to enable generative artificial intelligence (AI) assisted document generation.

A document generation platform may receive a request for content generation from a user application. The request for content generation may comprise a template identifier of a plurality of template identifiers. Each respective template identifier of the plurality of template identifiers may be associated with a respective file format. The request for content generation may comprise an application identifier. The application identifier may be associated with (e.g., indicate) an application associated with the document generation request. The application associated with the document generation request may be capable of executing and/or loading files (e.g., of the file format indicated by the template ID in the request).

The document generation platform may generate a data package comprising a set of inputs and a prompt for artificial intelligence (AI) content generation. The set of inputs may be obtained from a network enterprise system using an application programming interface (API), for example. The set of inputs may comprise a template type, a text input, and/or one or more contextual fields.

The document generation platform may generate a content shell based on the template type and/or template. The template may comprise one or more sections and/or formatting information. The content shell may comprise one or more sections and formatting information, corresponding to the one or more sections and formatting information comprised in the template. The document generation platform may add at least the text input to a first section of the one or more sections of the content shell. The document generation platform may modify the formatting of the first section in accordance with the formatting information comprised in the content shell.

The document generation platform may create a generative AI prompt. The generative AI prompt may comprise a prompt for AI content generation and context information. The context information may comprise a seed prompt. The seed prompt may be generated using preconfigured text and/or semantic links. A semantic link may refer to a contextual field of the one or more contextual fields.

The document generation platform may send the generative AI prompt to a large language model (LLM) server. The document generation platform may receive, from the LLM server, a generative AI response, wherein the generative AI response comprises output from an LLM model hosted at the LLM server. The output may be responsive to the generative AI prompt.

The document generation platform may process the generative AI response. Processing the generative AI response may comprise adding the output received from the LLM model to a second section of the one or more sections of the content shell. Processing the generative AI response may comprise modifying a format of the second section in accordance with the formatting information comprised in the content shell.

The document generation platform may convert the content shell into a file in a volatile memory system associated with the content generation server, and send the file. The file may be of a file format that is associated with the template or template identifier comprised in the request for content generation. The file may be capable of being executed by an application associated with the request for content generation (e.g., indicated by the application identifier).

DETAILED DESCRIPTION OF THE INVENTION

Figure 1:
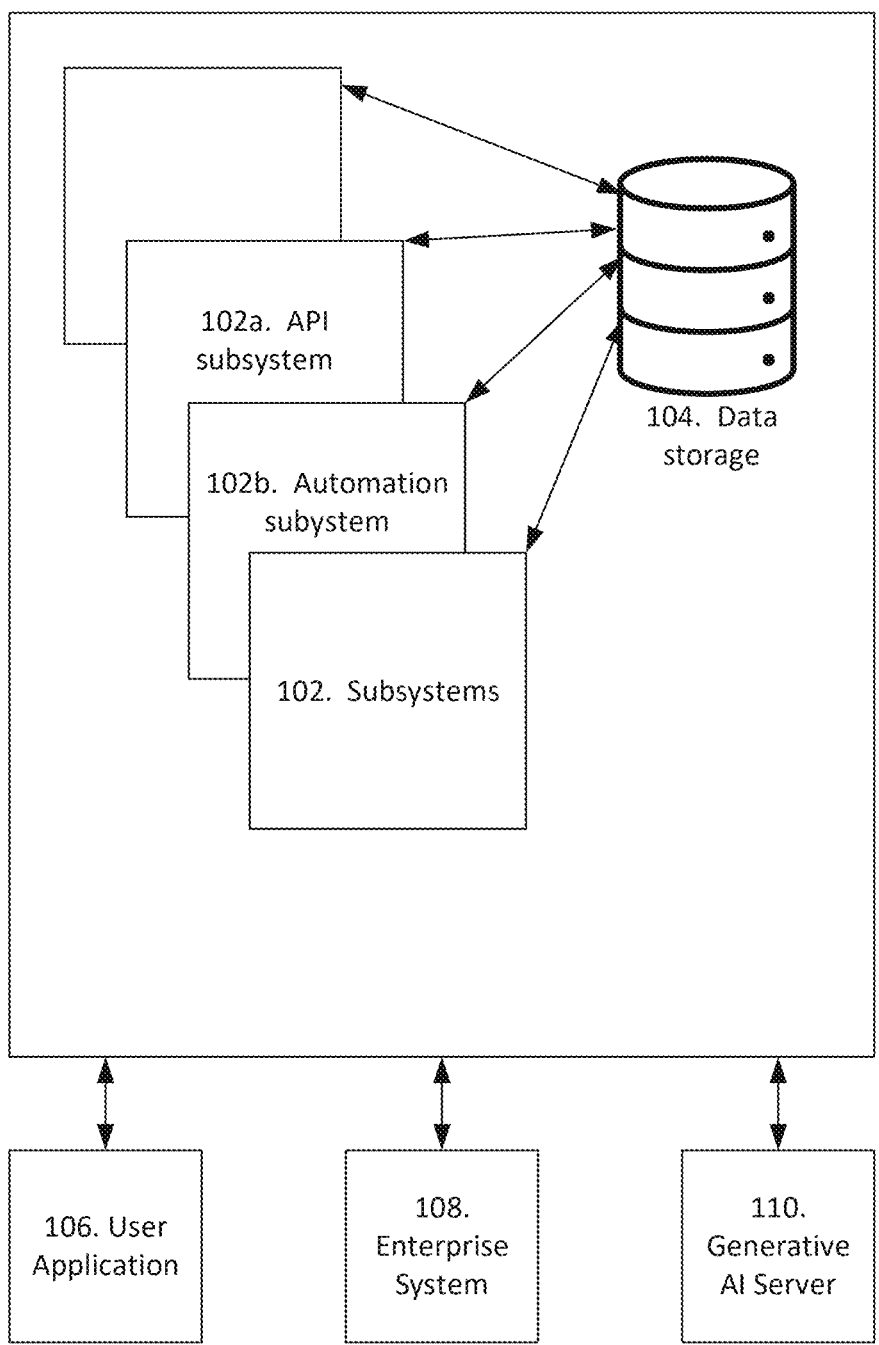
FIG. 1 is a system diagram of an example architecture for a document generation platform.

FIG. 1 shows a diagram of an example of a document generation platform 100. The document generation platform 100 may comprise one or more subsystems 102 and/or data stored in data storage 104. Each subsystem 102 may comprise software and/or hardware for operating as described herein. Any of the subsystems 102 comprised in the document generation platform 100 may utilize (e.g., read/write) the data in the data storage 104. In an example, the document generation platform 100 may comprise subsystems 102, such as an application-programming interface (API) subsystem 102a and/or an automation subsystem 102b, and a data storage 104 that can be used by one or both of the API subsystem 102a and the automation subsystem 102b.

In examples, the API subsystem 102a may be configured to interface with external devices or applications. The API subsystem 102a may use one or more APIs to interface with other subsystems and/or other applications. For example, the API subsystem 102a may interface with the automation subsystem 102b, an enterprise system 108, and/or a user application 106 (e.g., using APIs). The API subsystem 102*a* may be used to access different APIs for different applications. Different applications may include different application data and/or document types that may be loaded in, executed in, and/or edited. The applications may include third-party applications. The applications may include end-user applications executed locally or remotely (e.g., accessed via a web browser or other application). These different applications may include be a CRM application or service, such as a SALESFORCE application or service, and/or an add-on to a CRM application or service.

The API subsystem 102*a* may gather information by interfacing with one or more other systems (e.g., the user application 106, enterprise system 108, etc.) and/or subsystems. The API subsystem 102*a* may be preconfigured with or have access to APIs for accessing APIs of different applications, interfaces, and/or the configuration/rules thereof. The API subsystem 102*a* may be configured to interface with different applications or services provided by a third-party providers (MICROSOFT OFFICE applications, such as MICROSOFT WORD, POWERPOINT, EXCEL, etc.) and/or applications or services provided by different third-party providers (e.g., APPLE PAGES, KEY-NOTE, or NUMBERS; SALESFORCE SERVICES; etc.).

The API subsystem 102*a* may receive requests from a user (e.g., via the user's computing device and/or application) for document generation. The requests may prompt the user to provide information related to the type of API that is accessed to service the request, such as a document type, application type, format, etc. For example, the requests may prompt the user application 106 and/or the document generation platform 100 to display a GUI that may include one or more forms and/or fields that prompt the user with questions and/or for information (e.g., document title, template to be used, etc.) to assist in document generation. The prompts and/or questions that the GUI poses to the user may be adaptable (e.g., configurable) based on the type of document to be generated. In one example, the prompt may request a template identifier (ID) or other information from which a template ID may be determined. The type of document and/or the template for the document to be generated may be defined based on the selected template ID and/or the application type. For example, the GUI may present the user with one or more initial prompts and/or questions, the responses to which may be used to identify a document type and/or template. Additional prompts and/or questions (e.g., requesting information from the user) may be presented to the user in the GUI, the responses to which may be used to generate content within the template.

The API subsystem 102*a* may gather information from enterprise systems 108 (e.g., an active directory or identity provider (IdP) accessible via a network) and/or from the data storage 104 (e.g., via a database or directory hosted in the data storage). For example, the API subsystem 102*a* may receive the document generation request and/or the information provided in response to the associated questions and/or prompts. In response to receiving the document generation request, the API subsystem 102*a* may access the enterprise systems 108 and/or the data storage 104 for information to assist in document generation. The enterprise system 108 may include company information, personal information, financial information, and/or other information. The information stored in the enterprise system 108 may be client information that is personal or confidential information held stored on behalf of another party. In one example, the enterprise system 108 for an accounting company may store a record of transactions, dates, sales, or other information related to the business. In another example, the enterprise system 108 for a hospital or pharmacy may store a record of pharmaceuticals (e.g., by national drug code (NDC)), expiration dates, sales, methods of treatment, individuals with recorded prescriptions, or other information related to the business. The enterprise system 108 may include information that is stored separately and/or remotely from the data storage 104, which is used and accessible directly by the subsystems 102 of the document generation platform 100. The enterprise system 108 may be accessible by a user of the user application 106 that has a user account and/or security credentials (e.g., password, login, encryption, etc.) that is recognized by the enterprise system 108. Though a single enterprise system 108 is shown, a plurality of different enterprise systems may be accessible via the same user or different users capable of accessing different enterprise systems.

The data storage 104 may be local storage or storage that is directly accessible to the subsystems 102 of the document generation platform. The data storage 104 may include separate users and/or security credentials (e.g., password, login, encryption, etc.) that are accessible by the user application 106 for accessing the document generation platform 100. The data storage 104 may associate different users with different enterprise systems to which they may have access. The data storage 104 may include different template IDs and/or application identifiers associated with different templates and/or applications, respectively. The data storage 104 may identify different information types or fields for each template and/or application. The data storage 104 may identify different sections of each template and/or information types for each section. For example, the data storage 104 may store a separate template for each template ID, and/or information within each template for generating a document. Templates may be stored in the data storage 104 as XML files, or OpenOffice files. Templates may include rules or parameters related to formatting (e.g., for each section of the template and/or for each information type or field of the template or of sections of the template).

The API subsystem 102*a* may package the gathered information from the user application 106, the enterprise system 108, the data storage 104, and/or the document generation request (e.g., including information gathered from the prompts to the user) and send the gathered information to the automation subsystem 102*b*. The API subsystem 102*a* may send information that indicates a document structure for a given application that comports with certain rules and/or parameters that are required for that document type and/or application. For example, the API subsystem may have access to an API for a given application that provides the rules and/or parameters for ensuring proper formatting of the document type for execution in the application. In another example, the rules and/or parameters may be stored in the data storage 104.

In another example, which may reduce processing time in response to the document generation request, the gathered information at the API subsystem 102*a* may include the template ID, which may be used by the automation subsystem 102*b* for identifying the template for document generation that is pre-stored in the data storage 104. The template ID may indicate the application type, or the application type may be identified by a separate application identifier provided by the API subsystem 102*a*. The automation subsystem 102*b* may access the data storage 104 for determining the template from the template ID. Each section of the template identified by the template ID may include one or more information type or fields. Each information type or field may have a tag or other identifier that identifies a source of information for generating content for the section of the template. For example, the template may identify different sections of the document, including information types or fields to be filled with different types of enterprise data, input data from the prompt to the user via the application, AI-generated content, and/or a source of AI-generated content. Each section of the template may define objects (e.g., text, image, etc.), locations, and/or formatting (e.g., font size, font style, image size, etc.) for inserting content. The template may link information types or fields with the objects, locations, and/or formatting information for inserting content.

The automation subsystem 102*b* may process the packaged data and/or document generation request to service the document generation request. For example, a content generation shell may be generated based on the identified template and/or data associated with the template. Content (e.g., inputs from the packaged data) may be inserted into the content generation shell, and/or formatting of the content may be performed in accordance with the rules and/or parameters of the defined document type. The formatting of the content may be predefined in the template or otherwise based on rules and/or parameters on which the template is based. The automation subsystem 102*b* may create the content generation shell based on a template for a particular document type. The shell may include one or more sections. The shell may include (e.g., in each section) one or more predefined objects (e.g., text, image, etc.), locations, and/or formatting information (e.g., font size, font style, image size, etc.) for inserting content. Content (e.g., associated with information types or fields from the packaged data) may be used to populate the objects, and located and/or formatted in accordance with the locations and formatting for inserting content.

The automation subsystem 102*b* may communicate with one or more generative artificial intelligence (AI) servers, such as generative AI server 110, for preparing content for one or more predefined objects and/or locations within the document shell. The automation subsystem 102*b* may send a request to the generative AI server 110 for content generation, and may receive AI-generated content in return. The template may include data indicating an AI location (e.g., web address or application location identifier) to send data to for content generation based on answers to the prompt and/or the template selected. The request may include contextual information (e.g., based on the information received from the API subsystem 102*a*, and/or additional input from a user via the user application 106) for generating content. The automation subsystem 102*b* may insert the AI-generated content into the content generation shell (e.g., to populate the objects) and/or perform formatting (e.g., based on the locations and formatting information comprised in the shell and/or based on rules and/or parameters received from the API subsystem 102*a*). The automation subsystem 102*b* may then finalize the content generation shell to create the completed document. The completed document may then be sent back to the user (e.g., via the user application 106).

The document generation platform 100 may generate a variety of documents, including but not limited to web documents (e.g., HTTP, JavaScript, HTML, XML, etc.), word processing documents (e.g., DOCX, DOC, RTF, etc.), slide decks (e.g., Keynote slides, PowerPoint formats slides, etc.), and/or documents having other document types. The document generation platform 100 may generate information formatted to a particular service, which may be of a document type or format for being uploaded to the service.

The communications between the document generation platform 100, the user application 106, the enterprise system 108, and/or the generative AI server 110 can be performed using any of the inter-process communications (IPCs) or network-based communications described herein. The user application 106 may be a software application that is hosted at the user's computer, or in the cloud. The user application 106 may, for example, be a CRM application or service, such as a SALESFORCE application or service, and/or an add-on to a CRM application or service. The user application 106 may, for example, be a word processing application, such as MICROSOFT WORD, and/or an add-on to a word processing application. The user application 106 may, for example, be a web application (e.g., using JavaScript).

The user application 106 may comprise a user interface (UI) associated with the document generation platform 100. The user application 106 may comprise a graphical UI (GUI). The GUI may use a conversational approach to query the user for information related to a document generation request using questions or prompts. For example, a user may trigger a document generation process by pressing a button on the GUI. The GUI may include one or more forms and/or fields (e.g., in response to the trigger) that prompt the user with questions and/or prompts for information (e.g., document title, template to be used, etc.).

The prompts and/or questions that the GUI poses to the user may be adaptable (e.g., configurable) based on the type of document to be generated (e.g., where the type of document is defined based on the template or template ID selected). For example, the GUI may present the user with one or more initial requests, the response to which may be used to identify a document type and/or template. Additional requests for information may be presented to the user in the GUI, the response to which may be used to generate content within the template.

The generative AI server 110 may be an LLM server (e.g., a Google Gemini server). The document generation platform 100 may communicate with the generative AI server 110 with or without any human intervention. For example, the document generation platform 100 may configure and send prompts for AI content generation to the generative AI server 110 (e.g., via an API), and receive responses comprising AI-generated content via the API autonomously. The prompts may include contextual information and/or may be based on information from the user (e.g., responsive to the prompts and/or questions comprised in the GUI).

The enterprise system 108 may comprise an SQL or non-SQL database, a CRM system, an ERP system, and/or another system capable of providing access to electronically stored information. In examples, the document generation platform 100 may be configured to perform API calls or generate queries for interfacing with the enterprise system 108. For example, the enterprise system 108 may have access to information/data that the document generation platform 100 may use to service a document generation request. The document generation platform 100 may make an API call or send a query to the enterprise system 108, and the enterprise system 108 may provide the requested information/data in response. In some examples, a document generation platform 100 may interface with a plurality (e.g., two or more) of enterprise systems 108, to acquire information/data necessary to service a request. The enterprise system 108 may be associated with a particular user account (e.g., the user account accessing the user application 106), such that the user account is authorized for accessing certain information from the enterprise system, such as certain personal information or corporate information.

Figure 2:
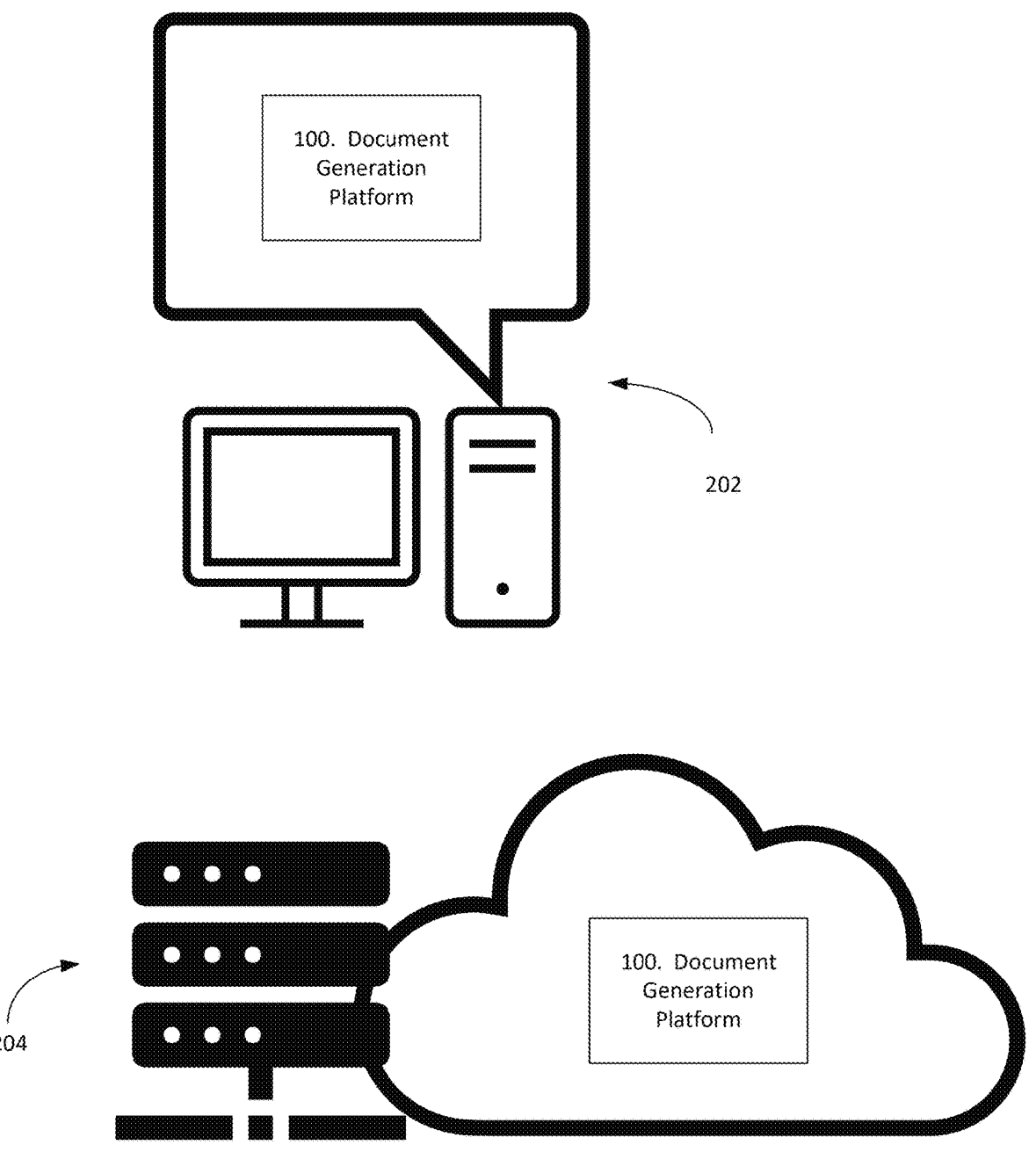
FIG. 2 is a system diagram of an example document generation platform for being hosted in one or more computing devices.

As shown in FIG. 2, the document generation platform 100, or portions thereof, may be hosted on one or more computing devices, such as computing device 202 and/or computing device 204. In some examples, the document generation platform 100, or portions thereof, may be locally hosted on a computing device 202, such as a desktop computing device, a laptop computing device, etc. For example, a portion of the document generation platform may be stored and/or executed on the computing device 202 for providing graphical user interfaces displayed to a user and/or receiving input from a user. In some examples, the document generation platform 100 may be remotely hosted (e.g., cloud-based) on a computing device 204, such as a server device or multiple server devices. For example, some or all of the software and data associated with the document generation platform 100 may be hosted on one or more remote computing devices 204, which may be accessed by a local computing device 202. In one example, the document generation platform 100 may be implemented (e.g., via computer-executable instructions) on a single computing device, such as computing device 202 or computing device 204. In another example, the document generation platform 100 may be distributed across multiple computing devices, such as one or more computing devices 202 and/or one or more computing devices 204.

Figure 3:
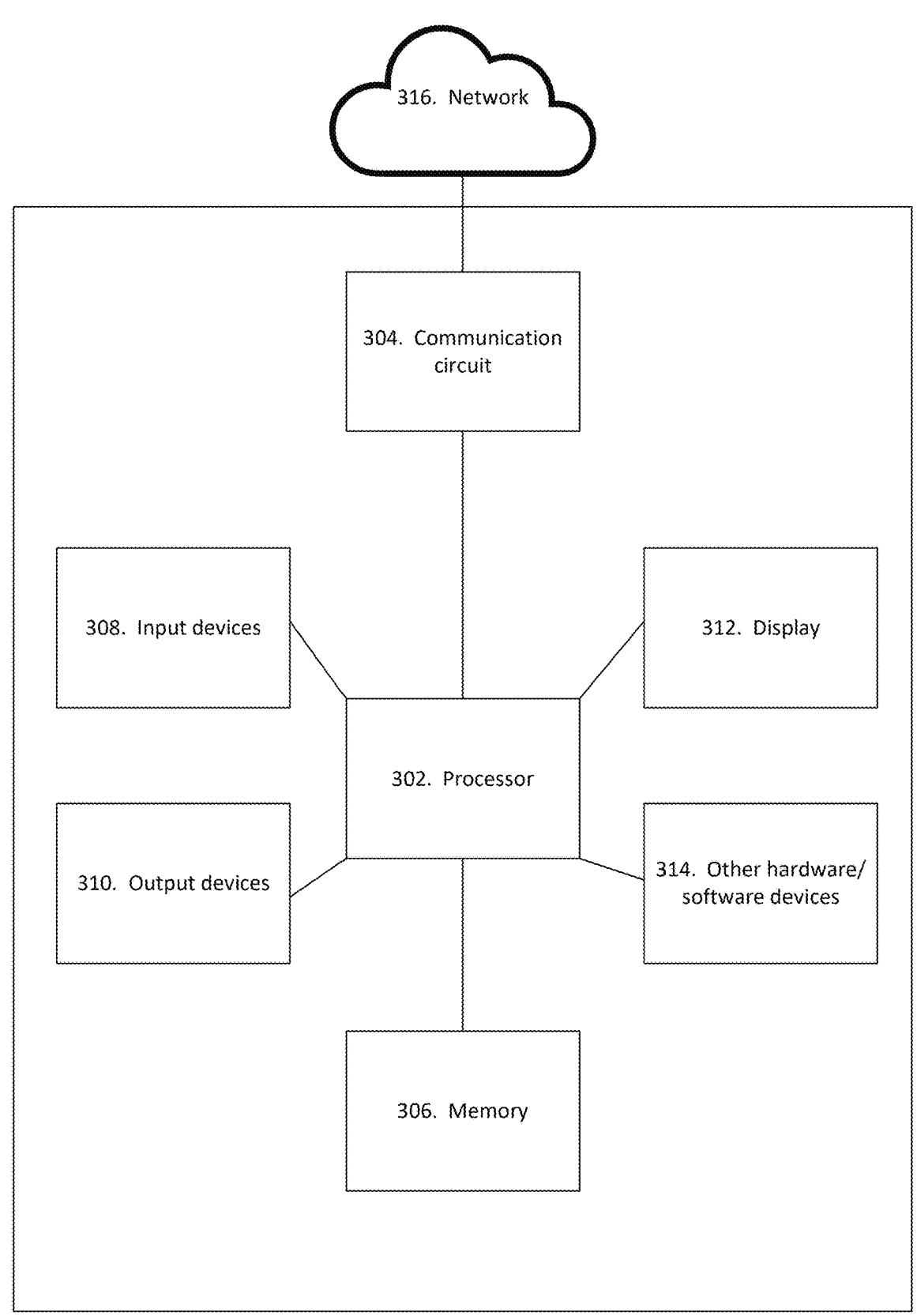
FIG. 3 is a system diagram of an example computing device.

FIG. 3 is a system diagram of an example of a computing device 300. The computing device 300 may comprise hardware and/or software for operating as described herein. One or more portions of the computing device 300 may be implemented in the computing device 202 and/or the computing device 204 for operating the document generation platform 100, as described herein with reference to FIG. 2. In the example shown in FIG. 3, the computing device 300 may include a processor 302, a communication circuit 304, a memory 306, input devices 308, output devices, 310, a display 312, and/or other hardware and/or software for operating as described herein. The computing device 300 is capable of communicating with a network 316 (e.g., via the communication circuit 304).

The processor 302 may include one or more general purpose processors and/or special purpose processors. The processor 302 may comprise a programmable logic device (PLD), a field programmable gate array (FPGA), an application specific integrated circuit (ASIC), a graphics processing unit (GPU), a central processing unit (CPU), and/or the like. The processor 302 may comprise digital signal processors and/or analog signal processors, microprocessors, integrated circuits, etc. The processor 302 may perform signal coding, data processing, image processing, power control, input/output processing, and/or any other functionality that enables the computing device 300 to perform the operations described herein.

The processor 302 may store information in and/or retrieve information from the memory 306. The memory 306 may comprise volatile (e.g., short term) and/or non-volatile (e.g., long term) memory. In examples, the memory 306 may comprise one or more of random access memory (RAM), read only memory (ROM) (e.g., electrically erasable programmable read-only memory (EEPROM)), a hard disk drive (HDD), a solid state drive (SSD), or any other type of memory storage. The memory 306 may comprise removable and/or non-removable memory. The memory 306 may be hosted in the computing device and/or hosted externally. The memory 306 may store instructions which are executable by the processor 302. For example, the memory 306 may include computer readable media or a computer-readable medium comprising computer-executable instructions configured to perform (e.g., when executed by the processor 302) as described herein. Data and information may be stored in different locations in the memory 306.

The computing device 300 may communicate with other devices via a network 316 using the communication circuit 304. The communication circuit 304 may send and/or receive information over the network 316. The communication circuit 304 may send and/or receive information to/from the processor 302. The communication circuit 304 may comprise a transmitter (e.g., transmitter circuitry) and/or a receiver (e.g., receiver circuitry). The communication circuit 304 may comprise one or more antennas and may be capable of performing wireless communications (e.g., WiFi, Bluetooth, and/or cellular communications). The communication circuit 304 may be capable of performing wired communications (e.g., using fiber optics or copper-based wiring). The communication circuit 304 may be capable of communication using one or more protocols, such as generation four long term evolution (4G-LTE), generation 5 (5G), WiFi, Bluetooth, near field communication (NFC), internet protocol (IP), transmission control protocol (TCP), for example. The computing device 300 may include one or more than one communication circuits.

The processor 302 may interact with one or more input devices 308 and/or output devices 310. The input devices 308 may include cameras, microphones, keyboards, barcode readers, buttons or keys, and/or any other devices that are configured to send information to the processor 302. The output devices 310 may include speakers, lights or indicators, or any other devices capable of sending signals from the processor 302 as output and/or converting those signals into output (e.g., visual output, audio output, haptic feedback, or another form of output).

An example of an output device that is commonly used is the display 312. A display 312 may be used to provide information to a user in a visual format. Not all computing devices may include a display 312. Some computing devices may have more than one display 312. The display 312 may be both an input device 308 and an output device 310. For example, the display 312 could comprise a screen for output, and a touch sensor (e.g., a touchscreen) for input.

The computing device 300 may comprise other hardware and/or software 314 in addition to the examples given herein for being implemented on the computing device. Examples of other hardware and/or software 314 may include positioning systems (e.g., global positioning system (GPS) devices) and/or security systems (e.g., trusted platform module (TPM) devices), for example.

Cloud servers may be a form of computing devices, such as the computing device 300. Stated another way, cloud servers may include one or more (e.g., all) of the forms of hardware and/or software described with respect to computing devices 300. Cloud servers may be configured to enable distributed processing and sharing of data across multiple cloud servers. For example, distributing processing techniques may enable a plurality of cloud servers to work together to host an application, such as a document generation platform, or a subsystem thereof.

Distributed processing may comprise breaking down computing tasks and workloads into pieces and distributing them among multiple cloud servers for parallel processing. The cloud servers may use separate computing threads to distribute processes or tasks. In examples, cloud servers may be configured to support load balancing. Load balancing can optimize distributed processing, by allowing multiple cloud servers, or different computing threads on a single cloud server, to balance the workloads amongst themselves. Distributed processing can be optimized by controlling various parameters. For example, the latency associated with a user communicating with the cloud servers can be considered. In examples, a cloud server system may select one or more processors, and/or one or more threads, that are geographically within a predefined distance to the user, and that therefore have lower latency, to support processing needs associated with the user.

Utilizing cloud server systems to host an application (e.g., a document generation platform and/or subsystems thereof) can provide a variety of benefits. For example, using cloud services can improve scalability and accessibility of the application, reduce latency, and/or improve security and reliability.

The one or more subsystems comprised in a document generation platform can be configured to allow communication with other subsystems comprised in the document generation platform, and/or with external entities, such as users or servers. For example, subsystems comprised in the document generation platform can be configured to communicate with one or more user computers, devices, and/or user applications. Additionally, or alternatively, subsystems comprised in the document generation platform can be configured to communicate with one or more databases, servers, and/or enterprise systems. For example, a subsystem may be configured to communicate with an external customer relationship management system (CRM), an enterprise resource planning (ERP) system, and/or a structured query language (SQL) or non-SQL database server. Additionally, or alternatively, subsystems comprised in the document generation platform can be configured to communicate with one or more generative AI servers.

In examples, communication between the subsystems can comprise inter-process communication (IPC) and/or communication across a network. In examples, IPC can use channels or pipes to convey data from one subsystem to another. IPC can use shared memory, such as random access memory (RAM) to facilitate data sharing between the subsystems. IPC can use socket-based communication to convey data between subsystems. Additionally, or alternatively, IPC can use system calls to the operating system of the host-computer or -server to enable communication between subsystems. Network-based communication may comprise socket-based communications, such as transmission control protocol (TCP)/internet protocol (IP)-based communications. Network-based communications may comprise the use of markup protocols such as hypertext transfer protocol (HTTP), HTTP-secure (HTTPS), and/or XML. Network-based communications may utilize web-based communication protocols such as representative state transfer (REST) or simple object access protocol (SOAP). Network-based communications may utilize message queueing protocols such as advanced message queueing protocol (AMQP), or systems implementing such protocols. Communication between the subsystems and external entities, can be accomplished using any combination of the IPC or network-based protocols discussed above.

A document generation platform can generate a variety of different types of documents. In examples, a document generation platform can generate textual files (e.g., .txt, .csv, etc.), word processor files (e.g., .doc, .docx, .pages, .rtf, etc.), slide deck files (.ppt, .pptx, .key, etc.), web formats (e.g., HTML, XML, etc.), and/or media files (e.g., audio, image, and/or video files). The document my include any file type that can be stored in an electronic format. The document generation platform can produce images, audio, video, and/or other media.

The content of documents created by a document generation platform can also vary. In examples, a document generation platform can generate business documents, such as reports, proposals, presentations (e.g., slide decks), letters, and/or memoranda. A document generation platform can generate legal documents such as sales agreements, terms sheets, privacy notices, compliance documents, contracts, invoices, and/or legal agreements. A document generation can generate financial documents such as bank statements, balance sheets, income statements, tax documents, and/or the like. A document generation platform can generate marketing materials such as posters, or ads. A document generation platform can generate emails and/or email signatures.

A user of a document generation platform can configure one or more templates, and/or the templates may be predefined. A template may be associated with one or more document types (e.g., .doc, .docx, .pptx, etc.). A template may be associated with one or more types of content (e.g., letter, memorandum, etc.). A template may have a name and/or an identifier (ID). The user may configure a template with preexisting inputs or content (e.g., text and/or images). For example, a user may preconfigure a document template with a corporation's logo in the document header, or contact information in the footer. The template may also be configured with formatting information associated with the text and/or images. For example, the user can configure the text in the header to be of a particular font or size, and/or the user can configure a picture to be of a particular width.

Document generation platforms can be rules-based. For example, a document generation platform may create a content shell for a document according to rules that are configured for a particular template that the user selects. The rules may be used to create the template, included in the template, and/or stored with the template for generating the content shell. The document generation platform may insert one or more inputs into the content shell, and format them according to the information comprised in the template and/or the associated rules (e.g., information related to locations and/or formatting).

The document generation platform may finalize the content shell by converting it to a file, and send the file to the user. The file may be created using a file format that is capable of being executed or loaded by an application associated with the document generation request. For example, an application ID comprised in the document generation request may identify an application associated with the document generation request, and the file may be generated in a format that is compatible (e.g., for loading and/or execution) with that application. The file format may also be associated with the template or template identifier (e.g., indicated in the document generation request).

In examples, the generation of the content shell, conversion to a file, and sending to the user may occur within the volatile (e.g., RAM) memory of the computing device or devices (e.g., cloud servers) where the document generation platform is hosted. After the document has been sent to the user, the associated file may be wiped from the volatile memory (e.g., marked for garbage collection, or expressly deleted). Performing document creation and/or management in volatile memory or other temporary memory may enhance user privacy, by ensuring that no potentially sensitive information or user/company specific data is stored within the document generation platform for subsequent access by other users or computing systems.

Templates for different types of documents may comprise different parameters, including sections, objects, locations, and/or formatting information. The template identifier may be stored with a template including predefined parameters (e.g., indicating sections, objects, locations, and/or formatting information) for the creating a content shell. The parameters may be based on the document type and rules for formatting/creating a document of a particular type, which may be determined based on an API specific to the application in which the document may be configured to operate. The parameters and/or rules for the content shell may be limited by size (e.g., the same or different for different document types) for processing and/or communication of data. Each document type may have different rules or parameters, depending on a third-party application that may be used to execute, load, edit, and/or save the document. In one example, the parameters for a document being generated in MICROSOFT WORD may be different than the parameters for a document being generated in MICROSOFT POWERPOINT or another application type. The parameters and/or rules for a given template may be identified and/or updated based on the API specific to the application. The parameters may also include additional parameters, such as parameters identifying a predefined size (e.g., number of pages, slides, word count, file size, etc.), predefined number and/or location of objects (e.g., media locations/size, text locations/fields, etc.), predefined content types for particular locations or object locations within a document (e.g., predefined header types, text types, locations for personal information, locations for AIML generated content, locations of logos) etc. The number and/or type of parameters may be dependent on the document type, size, and/or objects allowed in the document. In examples, parameters for a template may include metadata parameters (e.g., title, author, company, subject, keywords), parameters describing one or more preconfigured fields or sections in the document, parameters describing formatting (e.g., formatting information for fonts, underlining, font size, highlighting, etc.) for the content of each of the preconfigured objects, fields, or sections in the document, parameters describing default content for each of the preconfigured objects, fields or sections in document (e.g., a title, ID, default text, etc.), parameters describing the layout (e.g., landscape or portrait) of the document (e.g., per section), parameters describing the styles used, and more.

In one example, a template for a slide deck document may include parameters related to the number of slides to be included in the slide deck, content which is common to all slides (e.g., a header, footer, or background that is repeated on each slide), content which is to be included in only one slide (e.g., a paragraph to be included on slide 3, and formatting information for that paragraph). A template for a plain text file (e.g., .txt) may be more limited, for example, defining the location and spacing of different text fields in the file.

The document type and/or template may be selected based on one or more forms of input from the user. The parameters for the template (e.g., sections, objects, fields, formatting information) may be filled in based on one or more forms of input from the user. For example, a user may be presented with questions or prompts for input for identifying a document type, template, and/or inputs to fill the sections, objects, and/or fields of the document with content.

The document generation platforms may ensure compliance with requirements within a given application, or across application types. The document generation platform may ensure user/company privacy by limiting or avoiding data retention for sensitive or personal data. The document generation platform may ensure data limits are imposed for processing and/or communication of documents. The document generation platform may ensure uniformity across document types. For example, a user can ensure relative uniformity in format and/or content across documents created by different users by ensuring that each user uses the same template (e.g., for a given organization having an organization identifier or group of users) in a document generation platform when creating the documents. Additionally, a user can configure templates in a document generation platform to include statements or markings (e.g., preconfigured sections, objects, fields, etc.) that are necessary for legal or compliance reasons by default.

The document generation platform described herein may leverage artificial intelligence (AI) and/or machine learning (ML) (AIML) systems. Generative AI may refer to AI systems that are capable of creating unique content such as text, images, music, and/or videos. Generative AI systems can be trained using existing data to recognize patterns and/or structures. Then, in response to an input (e.g., prompt), the generative AI systems can produce original outputs. Generative AI systems may utilize ML for training, and may comprise one or more (e.g., deep) neural networks.

Figure 4:
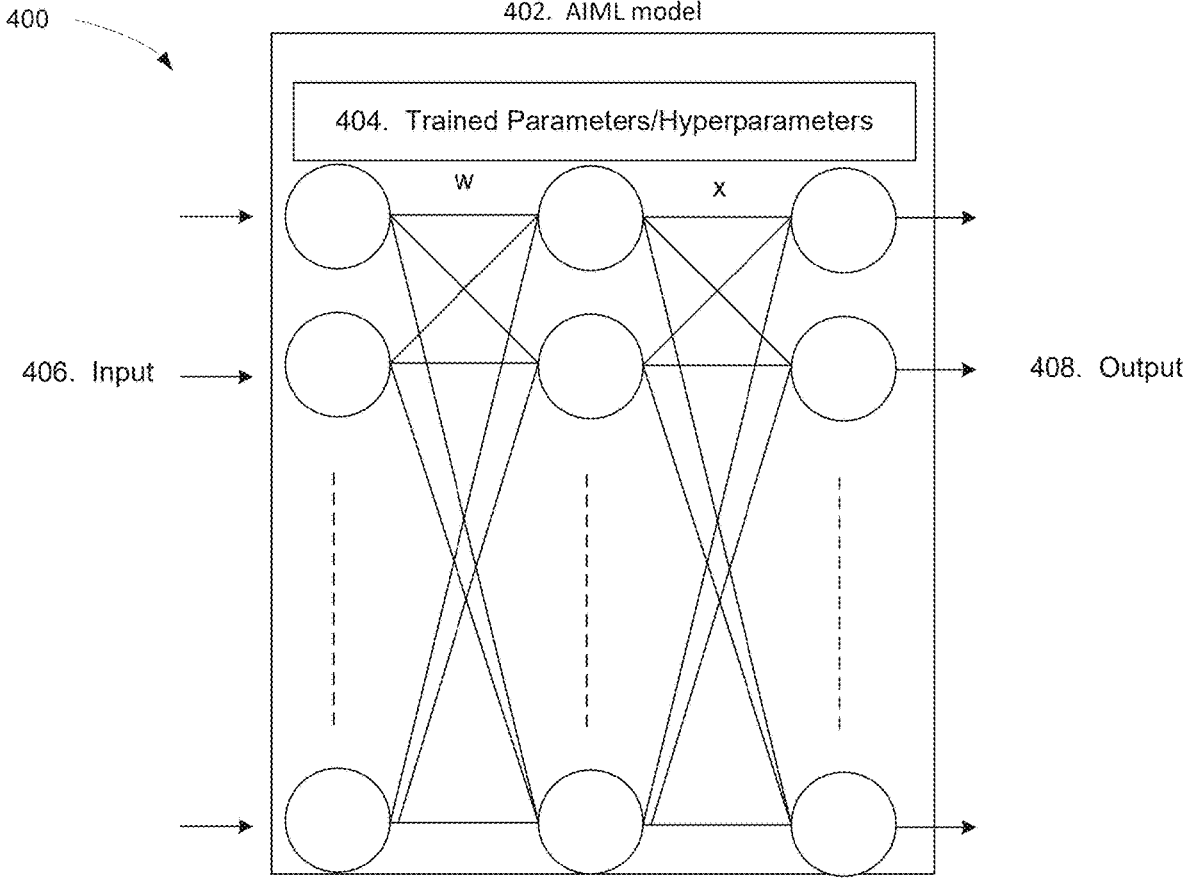
FIG. 4 is a system diagram of an example neural network artificial intelligence/machine learning (AIML) model.

In examples, AIML models may comprise a neural network with one or more layers. FIG. 4 shows an example AIML model 402 that comprises three layers, though different models may have varying layers. The AIML model 402 comprises a plurality of parameters and/or hyperparameters 404 (e.g., weights, biases, etc.), which may be set during training. The AIML model 402 may be provided with input 406 and the AIML model 402 may provide output 408 based on the input 406.

Training of an AIML model may involve the use of forward propagation and/or back propagation algorithms. In examples, input data with a known desired output may be fed into the AIML model during forward propagation. The model can then use the input to generate an output, from which a loss calculation may be performed. The loss calculation may indicate an error associated with the model's prediction. Based on the loss calculation (e.g., the error), the parameters (e.g., weights) comprised in the model may be adjusted in a manner that reduces the magnitude of the error during backpropagation. The magnitude and direction of the adjustments to the parameters can be determined using gradient descent methods. In examples, if the error was large, large adjustments may be made to the model's parameters, whereas if the error was small, comparatively small adjustments may be made. This process may be repeated iteratively until the model is capable of producing output that has a sufficiently low error (e.g., based on a calculated error metric being below a threshold value).

Large language models (LLMs) refer to specialized generative AIML systems that can be trained on massive amounts of data using deep learning. LLMs can comprise one or more deep neural networks (DNNs). LLMs can be designed to recognize and interpret patterns in language and/or data. For example, an LLM may be designed to process natural human languages. LLMs can generate and/or translate text, perform natural language processing tasks, and more. In examples, LLMs can respond to prompts in natural language, summarize or classify text, and even generate computer code or algorithms.

An LLM may utilize deep learning architectures to recognize relationships between different words and phrases. For example, an LLM using a transformer architecture may process input data to recognize the most relevant words (e.g., the "attention") of an input text field for formulating an output. Training using massive data sets can enable the LLM to recognize input and generate useful output.

Providing contextual information with the input to an LLM can help the LLM to generate useful output. For example, if input to an LLM includes restrictions on the tone (e.g., professional), the length (e.g., 150 words), or the audience (e.g., the public), the LLM may interpret the restrictions and tailor its output accordingly. This can help an LLM to provide output that complies with the various restrictions or constraints that a user wishes to impose.

An LLM may be hosted on a computing device and/or one or more cloud servers. The LLM may be accessed using any of the methods described above for communication between different subsystems of a document generation platform and/or computers and servers.

In examples, an LLM may be accessible via an API. For example, an application (e.g., a document generation platform) may send an API request to the LLM. The API request may include a prompt. The prompt may comprise a textual prompt for input to the LLM. The LLM may process the input and provide a response. The response may be sent to the application via the API.

Using LLMs can provide a variety of advantages. For example, LLMs can be used to automate tasks (e.g., with predefined restrictions/context). For example, LLMs can be used to summarize and/or translate works. LLMs can be used to perform data analysis, or computer code analysis. The LLMs can be given certain restrictions/context on the type of output to be provided to fit within a predefined format (e.g., object size, format, perspective, etc.).

Described herein is a document generation platform that may be implemented to enable the use of generative AI models, such as LLMs, for document generation of various formats and including various types of content. The document generation platform described herein may enable users to compound the benefits of a document generation platform with the capabilities of generative AI systems. For example, the creative and flexible capabilities of generative AI systems can be combined with the organizational and regulatory features of a document generation platform.

For example, enterprise organizations can utilize a document generation platform that is configured to work with generative AI. Such a system may perform rules-based document generation to ensure compliance and accuracy throughout a document, while utilizing generative AI to create content for some areas of the document.

The solutions described herein enable the blending of AI-generated content with rules-based automatic document generation for different document types. The AI-generated content can be formatted according to rules-based standards (e.g., configured by the enterprise user or other third-party user providing third-party applications), which may allow the AI-generation of content within a rules-based automatic content generation system. The output can be further uploaded to the appropriate application (e.g., third-party application) in the appropriate format for further updating by a user.

The document type and/or template may be selected based on one or more forms of input from the user (e.g., in response to questions or prompts in the GUI). The parameters for filling in the template may be based on one or more forms of input from the user. For example, a user may be presented with predefined questions or prompts for input that may be used to identify a document type, template, and/or form of input to fill the content of the document.

In examples, the document generation platform can use AI-generated content to populate one or more sections (e.g., slides, text boxes, fields in a form) of the document, which may be predefined or within predefined sections, objects, and/or fields. The document generation platform can generate documents of various formats (e.g., DOCX, DOC, HTML, JavaScript, PPTX, PPT, KEY, XLSX, XLS, etc.). The documents can include a predefined size (e.g., pages, slides, storage size) with one or more sections or fields. For example, a slide presentation document (e.g., .PPTX, .PPT, .KEY) can include a plurality of slides (e.g., each slide may correspond to a section or an object in the template), and each slide can include one or more fillable sections, objects, or fields (e.g., text boxes). The document generation platform can populate content in fillable sections, fields, or objects based on preconfigured rules (e.g., rules for automatically generating a title slide). Additionally, or alternatively, some content can be populated using AI-generated content (e.g., received from an LLM server in response to a generative AI prompt). In an example, a slide show could include a "summary" slide, wherein the summary is generated by an LLM server, based on a generative AI prompt.

Figure 5:
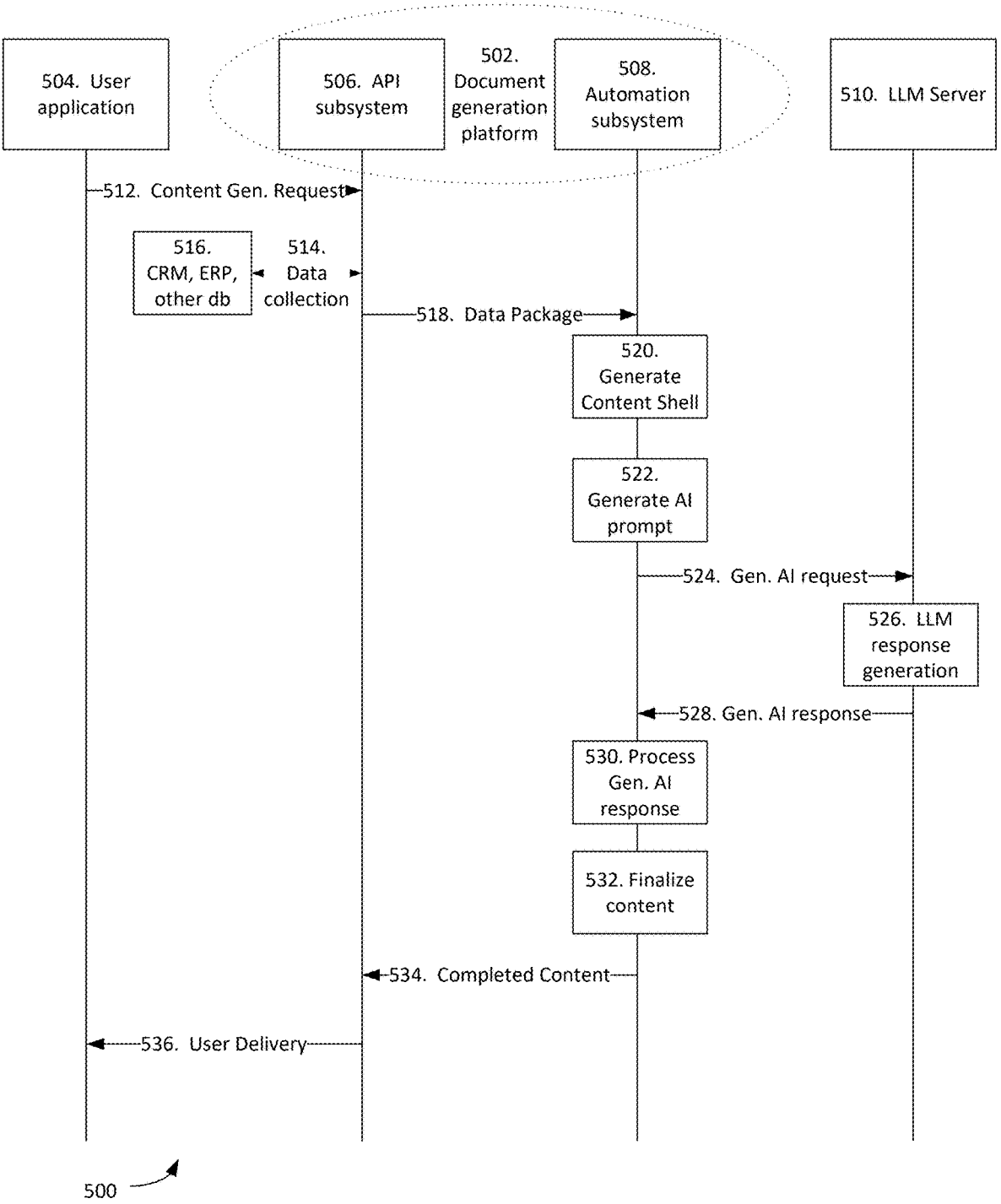
FIG. 5 is a communication flow diagram illustrating an example of communications performed between computing devices for servicing a document generation request.

FIG. 5 is a system diagram that shows an example system 500 of computer devices and/or subsystems that may be implemented to support generative AI-assisted content generation using a document generation platform 502. As shown in the system 500, the document generation platform may comprise one or more computing devices and/or subsystems, such as an API subsystem 506 and/or an automation subsystem 508. The document generation platform 502 may be in communication (e.g., via the API subsystem 506) with one or more user applications 504 or services operating on a user computing device and/or accessible to the user computing device. The document generation platform 502 may be in communication (e.g., via the automation subsystem 508) with one or more LLM servers 510. Although the example shown in FIG. 5 comprises an API subsystem 506 and an automation subsystem 508 are comprised in the document generation platform 502, fewer or additional subsystems may be implemented.

At 512, the user application 504 may send a document generation request to the API subsystem 506. The request may be sent in response to a user input via a graphical user interface (e.g., responsive to questions or prompts for information). The API subsystem 506 may acknowledge and/or confirm the request at 512 (e.g., by sending an acknowledgement).

The document generation request may include information for content generation, including a set of one or more inputs, a set of one or more content shell generation rules, and/or a set of one or more prompts for AI content generation. The set of inputs may include, for example, text fields (e.g., textual inputs), a field for template or template identifier (e.g., template ID), a field for an application identifier (e.g., identifying an application for the template or template ID), image fields (e.g., comprising pictures in JPEG format), and/or contextual fields (e.g., for AI-generation prompts). The set of inputs may be provided by the user in response to a set of questions or prompts provided to the user by the GUI. The set of questions may be different for different document types (e.g., indicated by template ID or template) or rules for generating different types of documents. For example, the user may be requested for a document type (e.g., indicated by template ID or template) and be presented with additional questions or prompts for information that will be used to generate the particular document type.

The API subsystem 506 may perform a data collection procedure at 514. In examples, the API subsystem 506 may contact an enterprise system 516 associated with the document generation request, to collect data. For example, the enterprise system 516 may comprise a CRM, an ERP, and/or another database. The enterprise system 516 may leverage APIs and/or JavaScript to connect with the enterprise system. This may enable the collection of relevant data for document generation.

The API subsystem 506 may query the enterprise system for parameters or information (e.g., including content to be used to fill a template) associated with the document generation request. The API subsystem may query the enterprise system 516 for text fields (e.g., textual inputs), a field for template or template identifier (e.g., template ID), a field for an application identifier (e.g., identifying an application associated with the template ID), image fields (e.g., comprising pictures in JPEG format), and/or contextual fields (e.g., for AI-generation prompts). For example, the API subsystem 506 may query the enterprise system 516 for the company name, an image of the company logo, or any other information which may not have been included in the document generation request, but which may be necessary to generate a document.

As part of the data collection procedure at 514, the API subsystem 506 may pull information from an active directory associated with the user application. The active directory may be hosted in an enterprise system, for example, and may be accessible via an API. The information may include information related to the company and/or one or more individuals within the company. For example, the API subsystem may pull the name, title, phone number, department, address, office, language, role, etc. of the author (e.g., user) from an active directory. As this may be personal information or confidential information to the business, the user may be validated to enable access to the information. The information may be maintained in volatile memory (e.g., RAM) at the document generation platform 502.

The active directory may comprise an identity provider (IdP) that is hosted by the user or a third party service provider (e.g., Okta, Microsoft, Google, Meta, etc.). In other examples, the active directory may be hosted in the document generation platform 502.

The API subsystem 506 may determine which information to query the enterprise subsystem for based on relevancy. Relevancy may be determined based on indications in the document generation request. For example, the document generation request may indicate a template ID, and the API subsystem 506 may be configured with a set of relevant information associated with the template ID. For example, the set of relevant information may indicate a list of fields for the template ID and/or the source where each piece of information in the list of fields can be found. In an illustrative example, the set of relevant information may indicate that the fields, "company logo," "company name," and/or "company motto" are requested for a particular template. The set of relevant information may further indicate that "company motto" and "company name" can be retrieved from a particular ERP system (e.g., using a specified query or search parameter(s)), whereas the "company logo" can be found in a different database (e.g., and can be retrieved using a specified query or search parameter(s)).

In examples, the set of relevant information associated with the template ID may be hosted in the data storage of the document generation platform, and may be accessible to the API subsystem 506 and/or the automation subsystem 508. For example, the template ID may be associated with a template that is saved in the data storage, and the template may comprise a variety of parameters as discussed above (e.g., sections, fields, objects, etc.). The data storage may also include tags and/or data types that are associated with parameters comprised in the template. For example, a field in a template for a word document may include a tag that indicates that it is to be filled in with information from a generative AI system, and the data type associated with this field may indicate that the field will contain textual information. Using tags and/or indications of data type, the API subsystem 506 may determine the source from which to retrieve information for one or more (e.g., each) parameter comprised in the template.

The API subsystem 506 may collect data of various types from the document generation request and/or enterprise systems, including, but not limited to text data, number data (e.g., floating point, integers, etc.), date data, image data (e.g., JPEG, PNG, etc.), audio data (e.g., mp3, WAV, etc.) and/or more. The types of data collected may vary depending on the document generation request (e.g., based on template ID, tags, and/or data type indications).

At 518, the API subsystem 506 may create a data package comprising some or all of the information comprised in the document generation request, and some or all of the information collected during the data collection procedure 514, and send the data package to the automation subsystem 508.

Once the automation subsystem 508 has received the data package, it may extract some or all of the information from the data package. The automation subsystem 508 may retrieve additional information (e.g., from configuration/administration files and/or databases, from the customer's active directory) that may be used to service the document generation request. For example, the automation subsystem may load a template and associated information from the data storage of the document generation platform to service the request. The information from the data package and any other information retrieved may be integrated into a common data model.

The automation subsystem 508 may process the combined data (e.g., common data model) using an automation language. This may allow the automation subsystem 508 to determine transformations that are to be applied to various parts of the document. For example, through processing the common data model, the automation subsystem 508 may determine (e.g., based on locations or formatting information in a loaded template) to position a text input at a certain point (e.g., in x,y coordinates) on a document), or to perform formatting, rotations, animations, or etc. for a particular input. The common data model may be accessible via a dot syntax.

Transformations may refer to actions performed on the document being created. Examples of transformations include, for example, inserting an image into a slide or a section of a document, changing the format or fonts, and more. In examples, transformations may include formatting. A common example of a transformation is applying a particular format or style to text or other content included in a document, based on preconfigured format information (e.g., style settings, indicated in the formatting information parameters of the template) for a particular company or department associated with the document generation request. In some examples, transformations may include inserting an entire slide, set of slides, or section of a document, based on a trigger in the document generation request. For example, if the document generation request is for a certain type of document (e.g., an estimate), it may trigger a transformation which causes the automation subsystem 508 to automatically insert a disclaimer slide or section.

At 520, the automation subsystem 508 may generate a content shell based on the data package and/or the common data model. In examples, the content shell may comprise a markup file format, such as XML or OpenXML. The content shell may be generated based on a selected template or template ID. The content shell may include one or more sections, objects, fields, etc., For example, the content shell may include a header and a body section. Furthermore, additional fields/subsections can be added to the content shell. For example, a "Title" field may be added to the header section or the body section, and text indicating the title of the document (e.g., retrieved from the user in response to questions or prompts in the GUI) can be added to the Title field. The content shell may predefine certain types of content or objects for certain predefined portions of the document, for a given document type.

In examples, the automation subsystem 508 may be configured with rules for generating a content shell based on one or more pieces of information received in the data package. For example, the automation subsystem 508 may pre-populate the content generation shell with certain fields based on the template ID comprised in the data package. In an example, if the template ID indicates that the document is for a memorandum, the rules configured for the template ID may trigger the automation subsystem 508 to generate and prefill the content shell using a template associated with the template ID that includes certain fields for the memorandum (e.g., fields for "To:", "From:", "Date:", and/or "Re:") or objects for the memorandum (e.g., media files, text fields, etc.). The rules may trigger the automation subsystem 508 to perform transformations (e.g., positioning, formatting, rotation, animation, etc.) for one or more of the fields in the content shell. Certain fields or objects may be associated with tags, such as data from the enterprise system, or labeled as particular types of information or data, such as user information, company information, brand information, AI-specific information, and/or one or more other types of information described herein.

Examples of document generation rules include, but are not limited to: brand guidelines, legal and/or compliance requirements, contextual relevance information, template-based configurations, and/or AI-specific prompts. Brand guidelines may assist the automation platform in selecting the proper fonts, colors, logos, and/or layout standards to use in the document. Legal and/or compliance requirements may include, for example, confidentiality clauses and/or local legislation based statements which should be printed in the document. Contextual relevance information may include rules based on the document's purpose. For example, such a rule may indicate that client proposal documents are to include pricing tables and associated disclaimer statements. Template-based configurations may include rules for determining which content blocks (e.g., slides, sections, etc.) should appear in the document based on inputs from the user application or enterprise system. AI-specific prompts may include rules for formatting, tone, and/or content structure for AI-generated content to be included in the document.

At 522, the automation subsystem 508 may generate one or more generative AI prompts. In examples, the generative AI prompts may include prompts for AI content generation and/or context information.

The prompts for AI content generation may be textual. The prompts for AI content generation may be from the document generation request received by the API subsystem 506 at 512 (e.g., input from the user in response to questions or prompts from the GUI), and/or may be retrieved from the enterprise system 516 via the data collection procedure at

514. In some examples, the prompts for AI content generation may include text from both the document generation request received by the API subsystem 506 at 512 and text retrieved from the enterprise system 516 via the data collection procedure at 514.

The context information may be textual. The context information may comprise a seed prompt. The seed prompt may be generated using preconfigured text and/or one or more semantic links. The semantic links may refer to one or more contextual fields (e.g., comprised in the data package). In an example, the seed prompt may include restrictions and/or guidelines for the generative AI model to follow when developing a response. Such restrictions may pertain to the length, the formatting, the audience, and/or the tone of the generative AI response.

In an illustrative example, a seed prompt configured to restrict the length of a generative AI response may comprise a text field, such as "Limit the response to {{Form. Max-Length}} words." In this example, the term, "{{Form. Max Length}}" may be a semantic link. When generating the context information for the generative AI prompt, the automation subsystem 508 may recognize the syntax, (e.g., "{{ . . . }}") as indicating a semantic link, and may be triggered to retrieve the value of the parameter Form. MaxLength and use it in the context information. In the illustrative example shown here, if the value of MaxLength was "150", then the context information generated based on the seed prompt and semantic link might be, "Limit the response to 150 words." The context information may be to limit the information to a specific size to fit the template or portion thereof.

As shown in the illustrative example above, semantic link may be used to dynamically configure a seed prompt. In examples, a semantic link may be indicated by the use of escape character (e.g., backslash, /) or an escape sequence (e.g., {{ or }}). The processor may recognize the escape character or sequence and process the link. Processing the link may involve interpreting syntax included in the semantic link and/or looking up an associated value (e.g., in the common data model or data package). In an example, a semantic link that reads {{Form.Customer_Name}} may trigger the processor to look up the value of a field named Customer_Name in a Form object (e.g., in the common data model or data package). In the seed prompt, the text of the semantic link (e.g., {{Form.Customer_Name}}) may not appear. The text of the semantic link may be replaced with the value of the field indicated by the semantic link.

The automation subsystem 508 may combine a prompt for AI content generation with context information to create a generative AI prompt. For example, the user may input a prompt for AI content generation that states, "Summarize the changes in value of company X's stock over the last year." In this case, this prompt for AI content generation could be combined with context information, such as the restriction, "Limit the response to 150 words," as discussed in the illustrative example above. In this case, the completed prompt for AI generation might be, "Summarize the changes in the value of company X's stock over the last year. Limit the response to 150 words."

This simple example is intended to illustrate how semantic links and seed prompts may be used to generate context information, and how context information may be used to restrict prompts for AI content generation. In practice, a variety of restrictions may be included in the context information, and used to configure the prompt for AI generation. For example, context information might restrict the length, the formatting, the tone, the audience, etc.

Furthermore, the specific restrictions (e.g., seed prompts and/or semantic links) may vary based on the template ID selected, and/or the specific field associated with the prompt for AI generation. For example, if a template is for a marketing document, it may trigger the automation system 508 to restrict the audience to "the general public," or a similar audience identifier. On the other hand, if a template is intended for a company-internal presentation, the audience may be restricted to "corporate" or "professional," for example. Similarly, if a prompt for AI content generation is intended to be used to fill a field that is the title of a slide, the length restriction may be limited to a predefined limit (e.g., 15 words or less). On the other hand, if a prompt for AI content generation is intended to be used to fill a field that is the body of a slide, the length restriction may be a larger predefined limit (e.g., 200 words or less).

The configuration to restrict AI-generated prompts may ensure that AI-generated content can be used seamlessly, without human intervention, in rules-based automatically generated documents, to meet certain processing/memory/communication requirements. Restricting the length, tone, and/or formatting of AI-generated content that will be inserted into a document can ensure that the content will fit properly within the allocated space, that the formatting will be clear and readable, that the tone used is appropriate for the use case, that the data will be processed within a certain period of time using designated resources (e.g., particular partitions/threads of volatile memory).

The automation subsystem 508 may be capable of communicating with a variety of generative AI servers. The communication between the automation subsystem 508 and the generative AI servers (e.g., LLM servers) may be accomplished through a third party API (e.g., an AzureOpenAI API endpoint).

The automation subsystem 508 may select a particular generative AI server or service to handle a generative AI prompt based on a variety of factors. For example, the automation subsystem may be configured to use a specific generative AI server or service based on the user, and/or the requested document type (e.g., based on template ID). Alternatively, or additionally, the document generation request or information collected from the enterprise system 516 may indicate which generative AI server or service to use to handle the request. In some examples, the automation subsystem 508 may select a generative AI server or service to handle a generative AI prompt based on a field or object that is associated with the prompt. For example, if the generative AI prompt is intended to fill an image field, the automation subsystem 508 may select a generative AI server or service that specializes in image creation, whereas if the generative AI prompt is intended to fill a text field, the automation subsystem 508 may select a different generative AI server or service that specializes in generating textual information. In some cases, a tag and/or data type associated with the object or field of a template to be filled using generative AI may be used to identify the generative AI server to service the request. For example, a tag associated with the field or object may expressly or implicitly identify a generative AI server to use. A data type associated with the field or object may be used to (e.g., implicitly) determine an appropriate generative AI server. A user and/or administrator can configure the automation subsystem 508 to use particular generative AI models on a task specific basis. For example, the user/administrator can configure the automation subsystem 508 to use a first LLM for certain tasks, and a second LLM for other tasks.

At 524, the automation subsystem 508 may send the generative AI prompt to the LLM server 510. The generative AI prompt may be formatted in a markup language (e.g., markdown, JavaScript object notation (JSON)). The LLM server 510 may process the prompt and generate a response at 526. At 528, the LLM server 510 may send the generative AI response to the automation subsystem 508. The generative AI response may be formatted in a markup language (e.g., markdown).

At 530, the automation subsystem 508 may process the generative AI response. Processing the generative AI response may comprise extracting textual output from the generative AI response. Processing the generative AI response may comprise performing one or more transformations, as discussed above, based on the AI response. The textual output of the generative AI response may be formatted using a markup language (e.g., markdown). In such cases, processing the generative AI response may comprise converting the textual response into a format that is compatible with the content generation shell (e.g., XML, OpenXML). Processing the generative AI response may further comprise performing formatting of the textual output based on the content shell generation rules comprised in the data package. In examples, performing formatting may involve adding information to the content generation shell, wherein the information is associated with one or more fields and/or sections of the content generation shell, and describes formatting to be associated fields and/or sections, or portions thereof.

At 532, the automation subsystem 508 may finalize the completed content generation shell. The finalized content generation shell may comprise an XML file (e.g., OpenXML), or an open office file (e.g., using OpenDocument Format (ODF)). The finalized content generation shell may comprise a word document (e.g., .doc, .docx, .rtf, etc.), a slide deck (e.g., .ppt, .pptx, .key, etc.), a spreadsheet (e.g., .xls, .xlsx, .numbers, etc.), a text file (e.g., .csv, .txt., etc.), or any of the other file formats discussed herein. The specific file format used may be selected based on the template or template ID, and/or based the application identifier associated with the document generation request. The completed content generation shell may be finalized in volatile memory (e.g., RAM). In some cases, the automation subsystem may be configured to never save the content generation shell in long-term memory, while it is being generated or after it is completed. Stated another way, each of the steps relating to the creation, finalization, and/or sending of the content generation shell may occur in the volatile memory of the computing device or devices (e.g., cloud servers) that host the document generation platform 502. This may enhance the privacy associated with the system, for example, by ensuring that documents that a user requests to be created, or portions thereof, are not stored in the document generation platform.

At 534, the automation subsystem 508 may send the finalized content generation shell, which is now referred to as a document, (e.g., an XML file or ODF file) to the API subsystem 506. The API subsystem 506 may forward the completed document to the user application 504 that requested the document creation at 536. The user application 504 may upload the document to a corresponding application for which the document is formatted for being updated and/or edited by the user. The document may include prompts to the user to identify certain fields, portions, and/or objects in the document and/or the location from which the information has been inserted.

Figure 6:
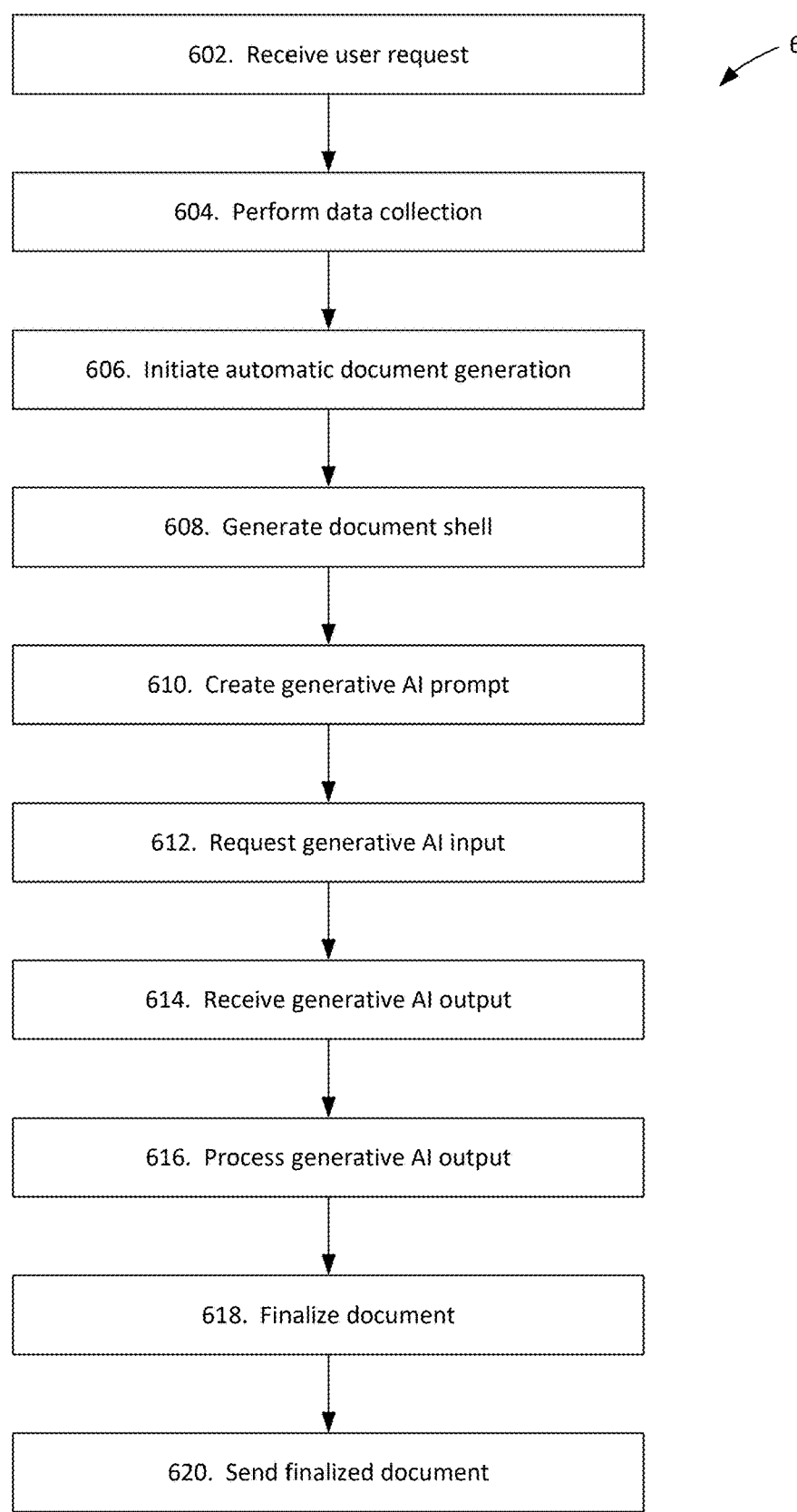
FIG. 6 is a flow chart showing an example procedure for automated document generation that uses generative AI.

FIG. 6 shows a flow diagram of a process 600 that may be implemented to generate documents using AIML-generated inputs. One or more portions of the process 600 may be implemented by one or more computing devices, as described herein. For example, one or more portions of the process 600 may be implemented by one or more processors (e.g., via computer-executable instructions) on one or more computing devices.

At 602, a request for document generation may be received from a user. For example, a user application (e.g., a web page) may send a request to create a document (e.g., a bill of sale). The document generation request may be received at a document generation platform. The document generation request may include input from the user (e.g., responsive to questions and/or prompts in a GUI that prompted the user for information).

At 604, the document generation platform may collect data associated with the document generation request. The document generation platform may extract all or a subset of the data to be collected from the document generation request. Additionally, or alternatively, the document generation platform may interface with one or more enterprise systems, such as CRMs, ERPs, and/or databases, to discover additional data or information that is needed to service the document generation request.

At 606, the document generation platform may initiate an automatic document generation procedure. The initiation of the document generation procedure may cause the generation of a document shell at 608, which may also be referred to as a content generation shell. The document generation shell may use a markup format such as XML or ODF. The document generation shell may be created based on a template saved in the data storage of the document generation platform. Certain fields and/or sections in the document shell may be automatically generated and/or filled based on information comprised in the document generation request and/or information discovered during data collection.

At 610, the document generation platform may create a generative AI prompt. The generative AI prompt may include preconfigured context information, which can be dynamically configured using a seed prompt and one or more syntactic links. The generative AI prompt may further configure a (e.g., user-input, responsive to GUI questions or prompts) textual prompt or query for AI-generated content.

At 612, the document generation platform may utilize an API to send the generative AI prompt to a generative AI server or service. The generative AI server or service may be dependent on the document type and/or field or section of the document for which the content is being used. At 614, the generative AI server may respond with output that is responsive to the generative AI prompt.

At 616, the document generation platform may process the output received from the generative AI server, and incorporate the output into the document shell. For example, if the output from the generative AI server is textual, the textual response may be extracted and inserted into an associated field or section in the document shell. In some cases, the document generation platform may perform formatting (e.g., by adding formatting information to the document shell) on the textual input. The formatting may be performed in accordance with content generation rules associated with the type of document (e.g., template ID) being generated.

At 618, the document generation platform may finalize the document shell, for example, by closing a file associated with the content generation shell (e.g., associated via template identifier, template, and/or application identifier). In examples, the file may be an XML document or a ODF file, a word file, a slide deck file, a spreadsheet file, and/or a textual file.

At 620, the document generation platform may send the finalized document to the user in response to the request. The size of the document and/or objects/fields therein may be limited to a particular size that enables the document to be provided in real-time, near real-time, or within a predefined period of time (e.g., including time for accessing the AI service) to provide documents responsive to the user request. The finalized document may be uploaded in the corresponding application for being reviewed and/or edited by the user therein.

The embodiments described herein may be used in conjunction with authentication procedures and/or protocols, to improve security. For example, before allowing a user to request document generation, the user may be authenticated via an authentication protocol (e.g., industry standard methods such as OAuth1, OAuth2, PKCE, token based authentication, certificate based authentication, username+password based authentication, etc.). Data may be encrypted (e.g., end-to-end encrypted) before transmission. Additionally, or alternatively, communication between the various subsystems in the document generation platform, or between the subsystems and external entities (e.g., enterprise systems, LLM servers, etc.) may be performed in a similar manner. Data stored in the document generation platform (e.g., user data, active directories) may be encrypted for privacy protection purposes, and any requests/data sent or received by the document generation platform may be encrypted.

For example, the document generation platform may send an encrypted HTTPS request (e.g., a generative AI request, as discussed herein) to an LLM server for generative AI input associated with a document generation request. The LLM server may send an encrypted HTTPS response (e.g., a generative AI response). Processing the response from the LLM server may include decrypting the response prior to extracting the generative AI output from the response.

In another example, the document generation request from the user application may be received in by the document generation platform in an encrypted message, and may be decrypted (e.g., using any of the methods mentioned above) before the response is processed. Similarly, the finalized document may be sent back to the user in an encrypted format, for privacy protection. The user application may be configured to decrypt the finalized document before rendering it in a usable format to the user.

In another example, communications between the enterprise system and the document generation platform may be encrypted. For example, queries sent to the enterprise system may be sent in an encrypted format, to be decrypted by the enterprise system prior to processing. Similarly, responses from the enterprise system (e.g., containing textual information, images, etc., for use in document generation) may also be encrypted, such that the document generation platform needs to decrypt the responses before processing the information and incorporating it into the data package.

A document generation platform may comprise a computing device (e.g., a computer and/or a cloud server) and software (e.g., hosted on the computing device). The document generation platform may be configured to perform one or more of the following steps. The document generation platform may receive (e.g., from a user application) a request for content generation. The document generation platform may generate a data package based on the request for content generation. The data package may, in examples, comprise content shell generation rules, and/or a set of inputs (e.g., obtained from the user in response to prompts or questions in a GUI), which may include one or more prompts for AI content generation. The content generation rules may be included in the request for content generation, or obtained from a network enterprise system (e.g., CRM server, etc.) using an API. The set of inputs may comprise a template or template identifier, an application identifier, textual inputs, images, one or more contextual fields, number fields, or other data fields. Each input of the set of inputs may be included in the request for content generation and/or obtained from a network enterprise system.

In some examples, the document generation platform may authenticate the data package using a security procedure (e.g., OAuth2, OAuth1, and/or PKCE authorization). This may be desirable, for example, if the data package is sent from one subsystem of the document generation platform to another subsystem of the document generation platform.

The document generation platform may generate a content shell based on the template, template identifier, and/or application identifier in the set of inputs. The content shell may be generated based on a template associated with a template ID indicated in the document generation request (e.g., selected by the user in response to questions or prompts in the GUI). The content shell may comprise one or more sections, fields, objects, locations, and/or formatting information. For example, the content shell may include a "title" or "header" section and a "body" section, locations for one or more of the sections, and/or formatting information pertinent to one or more of those sections. The header section, for example, may include metadata associated with the template, template identifier, and/or application identifier. The body section, for example, may include a plurality of subsections (e.g., section 1, section 2, . . . , etc.)

The document generation platform may add at least the textual input to a first section of the one or more sections of the content shell. The document generation platform may, additionally, or alternatively, add the image field, and/or the number field, into a section, object, or field.

Tags and/or indications of data types associated with the fields, objects, and/or sections of the template may be used to restrict the types of content that can be inserted into each field, object, or section of the content generation shell. Locations and/or formatting information in the template can be used to apply formatting or transformations to the content that is inserted into each section of the content generation shell. The document generation platform may modify the formatting information comprised in the content generation shell, in accordance with one or more content generation rules. Modifying the formatting information may comprise, for example, adding information relating to highlighting, bolding, underlining, and/or font to the content generation shell.

The document generation platform may create a generative AI prompt. The generative AI prompt may comprise a prompt for AI content generation and context information. The prompt for AI content generation may be retrieved from a user in response to questions or prompts in the GUI, and/or derived based on information provided by the user. The context information may comprise a seed prompt. The seed prompt may be generated using preconfigured text and/or one or more semantic links. The semantic links may refer to one or more contextual fields that are comprised in the data package.

The document generation platform may send the generative AI prompt to an LLM server. The document generation platform may receive a generative AI response from the LLM server. The generative AI response may comprise output from an LLM model hosted at the LLM server. The output may be responsive to the generative AI prompt.

The document generation platform may process the generative AI response. Processing the generative AI response may comprise adding the output received from the LLM model/server to a second section of the one or more sections of the content shell. Processing the generative AI response may comprise performing formatting of the output received from the LLM model/server after adding it to the content generation shell. Processing the generative AI response may further comprise modifying the formatting information comprised in the content shell (e.g., to apply formatting to the output from the LLM model/server).

The document generation platform may convert the content generation shell into a file. This may occur in the volatile memory system (e.g., RAM) associated with the document generation platform. The document generation platform may send the file (e.g., to the user application).

Provided herein are examples in which the document generation platform, or one or more portions thereof, may be implemented. In one example, the document generation platform may be configured to enable document requests through a user application. The user application may be a CRM application, such as Salesforce, or another compatible end-user application. The document generation platform (e.g., or the API subsystem thereof) may be set up as an "add on" to the CRM application or other end-user application. The CRM application or other end-user application may include a menu and/or a user interface to enable the user to initiate a document generation request from the CRM application or other end-user application. For example, if the CRM application is Salesforce, a user of Salesforce may be able to trigger document generation by pressing a button in the Salesforce application or web interface.

Once the user triggers document generation (e.g., by pressing a button), the document generation platform may prompt the user for additional information. For example, the document generation platform, or the end-user application at the instruction of the document generation platform, may open a window or form containing one or more questions or prompts for information. The window or form may include input fields which may enable the user to select or enter inputs for the document generation process. As described herein, the questions or prompts in the prompt may be different for different CRM applications or other end-user applications.

The window and/or form may prompt the user to select a template to use for the document generation request. Upon selection of a template, another window of form (e.g., or the same form) may include additional questions or prompts (e.g., and corresponding input fields) to allow the user to provide inputs for content generation. Examples of input fields include a dropdown input field with a question or prompt indicating that the user to select from a list of possible classifications (e.g., confidential, internal, public, secret, top secret, restricted, unrestricted, etc.), and/or a fillable text field for the document's title.

Figure 7:
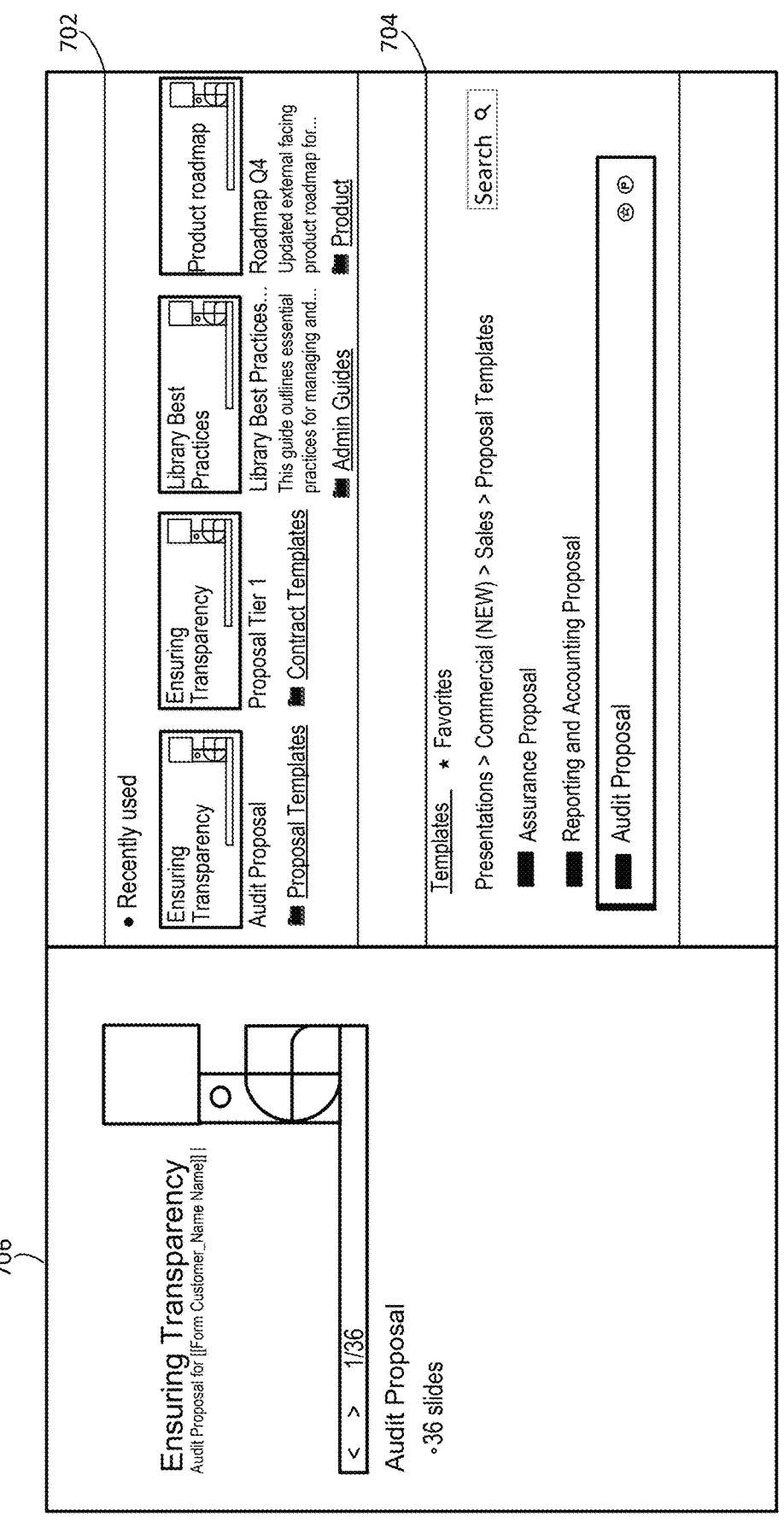
FIG. 7 is an illustration of an example of a graphical user interface (GUI) for selecting a template for document generation.

FIG. 7 shows an example of a window or form 700 that prompts the user to select a template to use for a document generation request. Each template may correspond to a template ID. The window or form 700 may comprise a list of frequently or recently used templates 702. The list of frequently or recently used templates 702 may display, for example, in tile format, buttons or links for creating one or more frequently or recently used templates. The window or form 700 may comprise a navigable list of templates 704. The navigable list of templates 704 may be organized using a tree structure. One or more templates are stored in folders or repositories, and the user can navigate between different folders or repositories of the tree structure using a graphical interface (e.g., by clicking between different folders, clicking an icon to expand the contents of a folder, by using a search tool, etc.). The window or form 700 may comprise a display 706 which shows a preview of the selected template. For example, if a user selects a template, a preview or image of what the template looks like may be displayed in the display 706. Upon selecting a template (e.g., as shown in the interface in FIG. 7), a second window or form (e.g., as shown in FIG. 8) may prompt the user for additional information.

Figure 8:
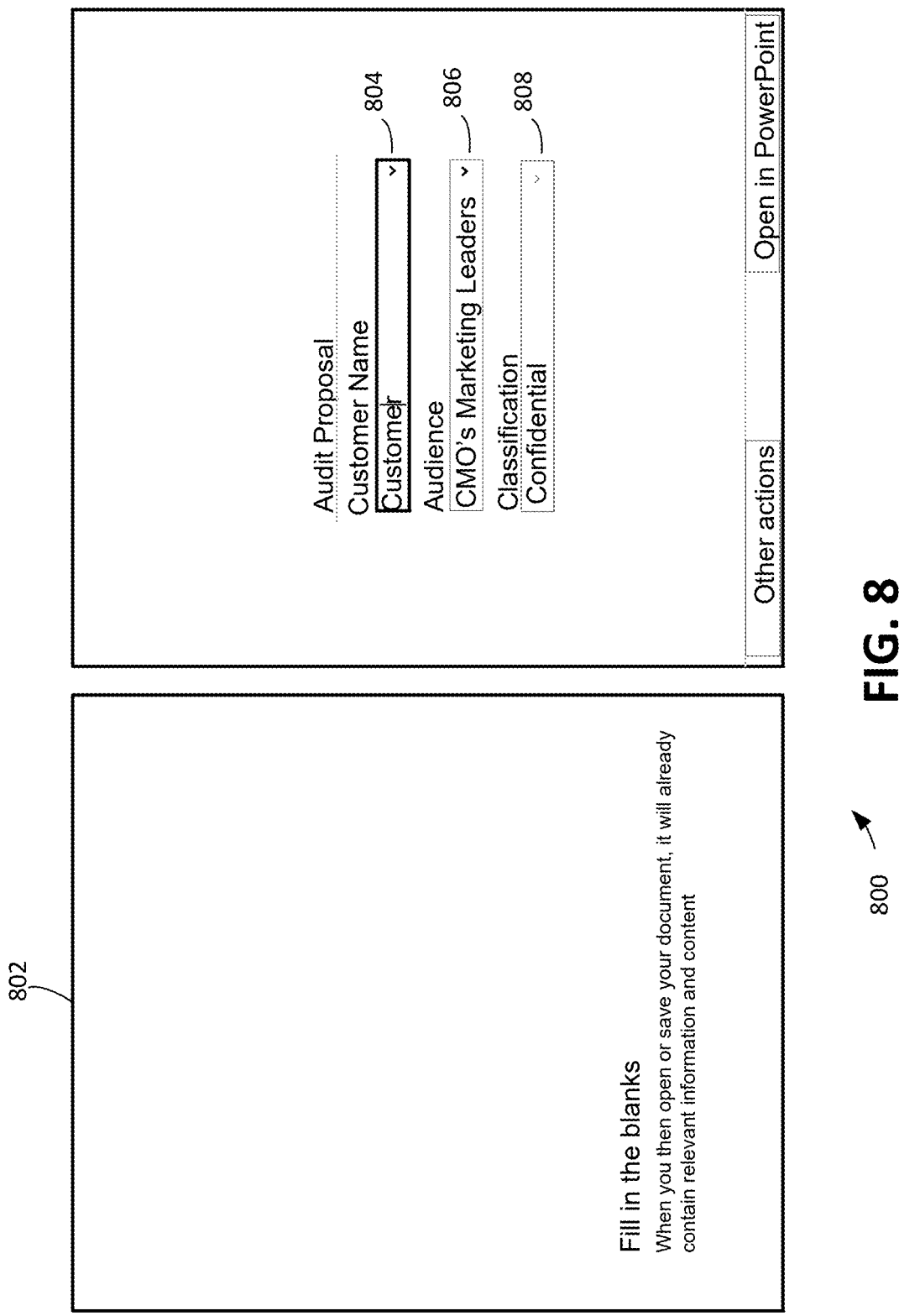
FIG. 8 is an illustration of an example of a GUI including prompts or questions prompting the user for information for a document generation request.

FIG. 8 shows an example of a window or form 800 that includes questions or prompts for the user for information related to a document generation request. The questions or prompts may be based on the selected template. The window or form 800 may comprise an instructions panel 802. The instructions panel 802 may display textual and/or graphical instructions guiding the user on what information is required and/or how to fill out the form. The window or form 800 may also comprise one or more input fields (e.g., 804, 806, 808) along with associated questions or prompts. The one or more input fields may allow the user to enter textual input, for example, or select from a set of preconfigured options (e.g., using a dropdown, radio button, etc.). In the example shown in FIG. 8, the window or form 800 comprises an input field for a customer's name at 804, the audience at 806, and a classification at 808.

In addition to the information collected from the user, the document generation platform may pull other information for the document generation request from a variety of other sources (e.g., from the CRM application, from an enterprise system, from an active directory associated with the user or document generation request, etc.). The information pulled from other sources may include contextual information (e.g., regarding the intended audience or tone of voice). Additionally or alternatively, the information pulled from other sources may include up-to-date data points (e.g., price numbers, sales figures, etc.).

The document generation platform may generate a content shell that comprises a plurality (e.g., two or more) of sections based on the selected template. One or more of the sections may be filled in, at least in part, using generative AI. On the other hand, some sections may not be filled in using generative AI. In an example, the document generation platform may configure generative AI prompts and request generative AI input to fill in some sections. However, other sections of the same document may be prepared without the use of generative AI.

Figure 9:
FIG. 9 is an illustration of an example of sections in a document generation shell or template.

FIG. 9 shows an example of sections in a document 900 to be generated based on the selected template. In the example, a subset of sections including executive summary 902, problem analysis 904, market insights 906, objectives and proposed solutions 908 and/or team bios 914. However, other sections of the same document, such as the timeline 910, customer references 912, scope of the project 916, pricing 918, or next steps 920 sections may be prepared without the use of generative AI.

For the sections that are at least partially AI-generated, document generation platform may generate prompts for a LLM server, send the prompts to the LLM server, and use the output from the server to fill the appropriate section of the document. For example, for a "team bio" section, the document generation platform may pull information about the identities (e.g., names), contact information (e.g., phone numbers), and/or qualifications (e.g., education, roles, etc.) of team members, and may include some or all of this information in a generative AI prompt for an LLM model to draft text for the team bio section. As discussed above, the document generation platform may supplement this information with contextual information (e.g., a seed prompt) which may restrict the length, tone, and/or other aspects of the LLM's response. The information regarding the team members may be added to the contextual information (e.g., seed prompt) using syntactic links, for example. Information input by the user (e.g., in response to GUI questions or prompts) may also be added to the generative AI prompt. Upon receiving a response from the LLM, the document generation platform may add the text from the response to the document. The document generation platform may perform formatting of the text included in the response (e.g., according to the rules associated with the template and/or document generation request).

What is claimed is:

1. A method to be used by a document generation platform, the method comprising:

receiving a request for content generation from a user application, wherein the request comprises a template identifier of a plurality of template identifiers, wherein each respective template identifier of the plurality of template identifiers is associated with a respective file type having a file format for a corresponding template of a plurality of templates;

identifying the template of the plurality of templates based on the template identifier, wherein the template comprises the respective file type indicated by the template identifier, and wherein the template comprises one or more sections and formatting information defined by the template for the respective file format of the file type indicated by the template identifier;

generating a data package configured to provide information for document generation to an automation subsystem, the data package comprising:

the template identifier or the template, a predefined set of inputs for populating one or more sections of the template, wherein the predefined set of inputs comprises a first input associated with a first identified section of the one or more sections of the template, wherein the first input is associated with a predefined network enterprise system, wherein the predefined network enterprise system comprises information associated with a company, and wherein the predefined set of inputs comprises a second input associated with a second identified section of the one or more sections of the template for insertion of artificial intelligence (AI) generated content, and information for AI content generation;

generating a content shell based on the template identifier or the template, wherein the content shell comprises the one or more sections and the formatting information for the respective file format of the file type indicated by the template identifier;

requesting, from the predefined network enterprise system, the first input of the predefined set of inputs associated with the first identified section of the one or more sections of the content shell;

inserting the first input corresponding to the first identified section identified in the template for the file type in accordance with the formatting information;

creating a generative AI prompt for populating the second section of the content shell with the AI-generated content, wherein the generative AI prompt is generated by:

retrieving preconfigured text and a semantic link based on the template identifier or the template, wherein the preconfigured text includes restrictions based on a word count and an audience indicated in the template, wherein the semantic link comprises a textual escape sequence and an indication of refers to a contextual field comprised in the information for AI content generation, and replacing the semantic link with the text comprised in the contextual field comprised in the information for AI content generation;

sending the generative AI prompt to a large language model (LLM) server;

receiving, from the LLM server, a generative AI response, wherein the generative AI response comprises output from an LLM model hosted at the LLM server, the output being responsive to the generative AI prompt;

adding textual output comprised in the output received from the LLM model to the second section of the one or more sections of the content shell;

modifying a format of the second section in accordance with the formatting information comprised in the content shell;

converting the content shell into a file of the respective file format associated with the template identifier in a volatile memory system associated with the document generation platform; and sending the file to the user application in the file format that is associated with the template identifier comprised in the request for content generation.

2. The method of claim 1, wherein the set of inputs further comprises a number field or an image field, the method further comprising adding the number field to the content shell; and adding the image field to the content shell.

3. The method of claim 1, further comprising: authenticating the data package using a security procedure.

4. The method of claim 3, wherein the security procedure is associated with open authorization 1 (OAuth1), open authorization 2 (OAuth2), or proof of key code exchange (PKCE) authorization.

5. The method of claim 1, further comprising modifying the formatting information comprised in the content shell by adding information relating to highlighting, bolding, underlining, or font.

6. The method of claim 1, wherein the one or more sections comprised in the content shell include a header section and a body section, wherein the header section includes metadata associated with the template or template identifier, and wherein the body section includes a plurality of subsections.

7. The method of claim 1, wherein the request for content generation comprises an application identifier of a plurality of application identifiers, wherein the application identifier indicates an application associated with the request, wherein the application associated with the request is capable of executing or loading files of the file format that is associated with the template identifier.

8. A document generation computing device configured to host a document generation platform, the document generation computing device comprising a processor, wherein the processor is configured to:

receive a request for content generation from a user application, wherein the request comprises a template identifier of a plurality of template identifiers, wherein each respective template identifier of the plurality of template identifiers is associated with a respective file type having a file format for a corresponding template of a plurality of templates;

identify the template of the plurality of templates based on the template identifier, wherein the template comprises the respective file type indicated by the template identifier, and wherein the template comprises one or more sections and formatting information defined by the template for the respective file format of the file type indicated by the template identifier;

generate a data package configured to provide information for document generation to an automation subsystem, the data package comprising:

the template identifier or the template, a predefined set of inputs for populating one or more sections of the template, wherein the predefined set of inputs comprises a first input associated with a first identified section of the one or more sections of the template, wherein the first input is associated with a predefined network enterprise system, wherein the predefined network enterprise system comprises information associated with a company, and wherein the predefined set of inputs comprises a second input associated with a second identified section of the one or more sections of the template for insertion of artificial intelligence (AI) generated content, and information for AI content generation;

generate a content shell based on the template identifier or the template, wherein the content shell comprises the one or more sections and the formatting information for the respective file format of the file type indicated by the template identifier;

request, from the predefined network enterprise system, the first input of the predefined set of inputs associated with the first identified section of the one or more sections of the content shell;

insert the first input corresponding to the first identified section identified in the template for the file type in accordance with the formatting information;

create a generative AI prompt for populating the second section of the content shell with the AI-generated content, wherein the generative AI prompt is generated by:

retrieving preconfigured text and a semantic link based on the template identifier or the template, wherein the preconfigured text includes restrictions based on a word count and an audience indicated in the template, wherein the semantic link comprises a textual escape sequence and an indication of a contextual field comprised in the information for AI content generation, and replacing the semantic link with the text comprised in the contextual field comprised in the information for AI content generation;

send the generative AI prompt to a large language model (LLM);

receive, from the LLM, a generative AI response, wherein the generative AI response comprises output from an LLM model hosted at the LLM, the output being responsive to the generative AI prompt;

add textual output comprised in the output received from the LLM model to the second section of the one or more sections of the content shell;

modify a format of the second section in accordance with the formatting information comprised in the content shell;

convert the content shell into a file of the respective file format associated with the template identifier in a volatile memory system associated with the document generation computing device; and send the file to the user application in the file format that is associated with the template identifier comprised in the request for content generation.

9. The document generation computing device of claim 8, wherein the set of inputs further comprises a number field or an image field.

10. The document generation computing device of claim 9, wherein the processor is further configured to:

add the number field to the content shell; and add the image field to the content shell.

11. The document generation computing device of claim 8, wherein the processor is further configured to: authenticate the data package using a security procedure.

12. The document generation computing device of claim 11, wherein the security procedure is associated with open authorization 1 (OAuth1), open authorization 2 (OAuth2), or proof of key code exchange (PKCE) authorization.

13. The document generation computing device of claim 8, wherein the processor is configured to add information relating to highlighting, bolding, underlining, or font to the formatting information of the content shell.

14. The document generation computing device of claim 8, wherein the one or more sections comprised in the content shell include a header section and a body section.

15. The document generation computing device of claim 14, wherein the header section includes metadata associated with the template or template identifier, and wherein the body section includes a plurality of subsections.

16. The document generation computing device of claim 8, wherein the request for content generation comprises an application identifier of a plurality of application identifiers, wherein the application identifier indicates an application associated with the request.

17. The document generation computing device of claim 16, wherein the application associated with the request is configured to execute or load files of the file format that is associated with the template identifier.

18. At least one non-transitory computer readable storage medium having instructions stored thereon that are configured to, when executed by at least one processor, cause the at least one processor to:

receive a request for content generation from a user application, wherein the request comprises a template identifier of a plurality of template identifiers, wherein each respective template identifier of the plurality of template identifiers is associated with a respective file type having a file format for a corresponding template of a plurality of templates;

identify the template of the plurality of templates based on the template identifier, wherein the template comprises the respective file type indicated by the template identifier, and wherein the template comprises one or more sections and formatting information defined by the template for the respective file format of the file type indicated by the template identifier;

generate a data package configured to provide information for document generation to an automation subsystem, the data package comprising:

the template identifier or the template, a predefined set of inputs for populating one or more sections of the template, wherein the predefined set of inputs comprises a first input associated with a first identified section of the one or more sections of the template, wherein the first input is associated with a predefined network enterprise system, wherein the predefined network enterprise system comprises information associated with a company, and wherein the predefined set of inputs comprises a second input associated with a second identified section of the one or more sections of the template for insertion of artificial intelligence (AI) generated content, and information for AI content generation;

generate a content shell based on the template identifier or the template, wherein the content shell comprises the one or more sections and the formatting information for the respective file format of the file type indicated by the template identifier;

request, from the predefined network enterprise system, the first input of the predefined set of inputs associated with the first identified section of the one or more sections of the content shell;

insert the first input corresponding to the first identified section identified in the template for the file type in accordance with the formatting information;

create a generative AI prompt for populating the second section of the content shell with the AI-generated content, wherein the generative AI prompt is generated by:

retrieving preconfigured text and a semantic link based on the template identifier or the template, wherein the preconfigured text includes restrictions based on a word count and an audience indicated in the template, wherein the semantic link comprises a textual escape sequence and an indication of a contextual field comprised in the information for AI content generation, and replacing the semantic link with the text comprised in the contextual field comprised in the information for AI content generation;

send the generative AI prompt to a large language model (LLM);

receive, from the LLM, a generative AI response, wherein the generative AI response comprises output from an LLM model hosted at the LLM, the output being responsive to the generative AI prompt;

add textual output comprised in the output received from the LLM model to the second section of the one or more sections of the content shell;

modify a format of the second section in accordance with the formatting information comprised in the content shell;

convert the content shell into a file of the respective file format associated with the template identifier in a volatile memory system associated with a document generation server; and send the file to the user application in the file format that is associated with the template identifier comprised in the request for content generation.

19. The at least one non-transitory computer readable storage medium of claim 18, wherein the set of inputs further comprises a number field or an image field, wherein the instructions are configured to cause the at least one processor to:

add the number field to the content shell; and add the image field to the content shell.

20. The at least one non-transitory computer readable storage medium of claim 18, wherein the instructions are configured to cause the at least one processor to:

authenticate the data package using a security procedure, wherein the security procedure is associated with open authorization 1 (OAuth1), open authorization 2 (OAuth2), or proof of key code exchange (PKCE) authorization.

\* \* \* \* \*